US012523811B2

(12) United States Patent
Lee et al.

(10) Patent No.: US 12,523,811 B2
(45) Date of Patent: Jan. 13, 2026

(54) ELECTRONIC DEVICE INCLUDING ATTACHMENT MEMBER WITH LOSS TANGENT

(71) Applicant: InnoLux Corporation, Miao-Li County (TW)

(72) Inventors: Wei-Cheng Lee, Miao-Li County (TW); I-An Yao, Miao-Li County (TW); Jiunn-Shyong Lin, Miao-Li County (TW); Yi-Hui Lee, Miao-Li County (TW); Yung-Chih Cheng, Miao-Li County (TW); Hsin-Wei Huang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/913,000

(22) Filed: Oct. 11, 2024

(65) Prior Publication Data

US 2025/0147226 A1    May 8, 2025

(30) Foreign Application Priority Data

Nov. 7, 2023   (CN) .......................... 202311475388.6
Aug. 5, 2024   (CN) .......................... 202411064280.2

(51) Int. Cl.
*F21V 8/00*   (2006.01)
*G02F 1/1333*   (2006.01)
*G02F 1/1335*   (2006.01)

(52) U.S. Cl.
CPC ......... *G02B 6/0088* (2013.01); *G02B 6/0036* (2013.01); *G02F 1/133325* (2021.01); *G02F 1/133354* (2021.01); *G02F 1/133616* (2021.01)

(58) Field of Classification Search
CPC ............... G02B 6/0036; G02B 6/0088; G02F 1/133325; G02F 1/133354; G02F 1/133616
USPC ......................................................... 362/97.1
See application file for complete search history.

(56) References Cited

U.S. PATENT DOCUMENTS

| 2015/0003104 | A1* | 1/2015 | Huang | G02B 6/005 362/613 |
| 2022/0179261 | A1* | 6/2022 | Lin | G02F 1/133553 |
| 2023/0205039 | A1* | 6/2023 | Tai | G02B 6/0043 362/603 |
| 2023/0229041 | A1* | 7/2023 | Lee | G02F 1/13356 349/148 |

FOREIGN PATENT DOCUMENTS

| CN | 115756196 A | 3/2023 |
| TW | I598858 B | 9/2017 |

* cited by examiner

*Primary Examiner* — Keith G. Delahoussaye
(74) *Attorney, Agent, or Firm* — McClure, Qualey & Rodack, LLP

(57) ABSTRACT

An electronic device is provided. The electronic device includes a panel, a light-guide plate and an attachment member. The light-guide plate is disposed on the panel. The light-guide plate has a first surface with a plurality of optical units. The attachment member contacts a part of the first surface of the light-guide plate. The loss tangent (tan δ) at 30° C. of the attachment member is greater than 0 and less than or equal to 1.

19 Claims, 10 Drawing Sheets

ELECTRONIC DEVICE INCLUDING ATTACHMENT MEMBER WITH LOSS TANGENT

CROSS REFERENCE TO RELATED APPLICATIONS

This application claims priority of China Patent Application No. 202311475388.6, filed on Nov. 7, 2023, and China Patent Application No. 2024110642802, filed on Aug. 5, 2024, the entirety of which are incorporated by reference herein.

BACKGROUND

Technical Field

The present disclosure relates to an electronic device, and in particular it relates to an electronic device with an attachment member in contact with a light-guide plate.

Description of the Related Art

Nowadays, a variety of electronic devices are equipped with a display. To save energy, electronic devices should have low power consumption. To accomplish this, they may use reflective displays or semi-transflective displays. When a liquid-crystal display (such as a reflective liquid-crystal display (RLCD)) is equipped with a light-guide plate (LGP), glare will occur if there is no attachment member (such as optical glue) between the light-guide plate and the adjacent components. Taking the need for anti-glare properties into consideration, an attachment member is used to fit the light-guide plate and the adjacent components in a full-surface bonding manner. However, if an ordinary attachment member is used, it will easily fill the dots of the light-guide plate, which will affect the light-guide effect and darken the image.

SUMMARY

In accordance with one embodiment of the present disclosure, an electronic device is provided. The electronic device includes a panel, a light-guide plate and an attachment member. The light-guide plate is disposed on the panel. The light-guide plate has a first surface with a plurality of optical units. The attachment member is in contact with a part of the first surface of the light-guide plate. The attachment member has a loss tangent (tan δ) at 30° C., and the loss tangent (tan δ) at 30° C. of the attachment member is greater than 0 and less than or equal to 1.

In accordance with one embodiment of the present disclosure, an electronic device is provided. The electronic device includes a panel, a light-guide plate and an attachment member. The light-guide plate is disposed on the panel. The light-guide plate has a first surface with a plurality of optical units. The attachment member is in contact with part of the first surface of the light-guide plate. The attachment member is separated from the at least one of the plurality of optical units by a gap.

In accordance with one embodiment of the present disclosure, an electronic device is provided. The electronic device includes a panel, a light-guide plate, a protective substrate, a first attachment member and a second attachment member. The light-guide plate is disposed on the panel and has a first surface and a second surface opposite to each other. The first surface is away from the panel. The first surface has a plurality of recessed structures and a plurality of protruding structures. The plurality of protruding structures are respectively adjacent to the plurality of recessed structures. The protective substrate is disposed on the light-guide plate. The first attachment member is disposed between the light-guide plate and the protective substrate and in contact with the first surface. The second attachment member is disposed between the first attachment member and the protective substrate. Along the normal direction of the panel, a thickness of the second attachment member is greater than a thickness of one of the plurality of protruding structures.

BRIEF DESCRIPTION OF THE DRAWINGS

The disclosure can be more fully understood from the following detailed description when read with the accompanying figures. It is worth noting that in accordance with standard practice in the industry, various features are not drawn to scale. In fact, the dimensions of the various features may be arbitrarily increased or reduced for clarity of discussion.

DETAILED DESCRIPTION

Figure 1:
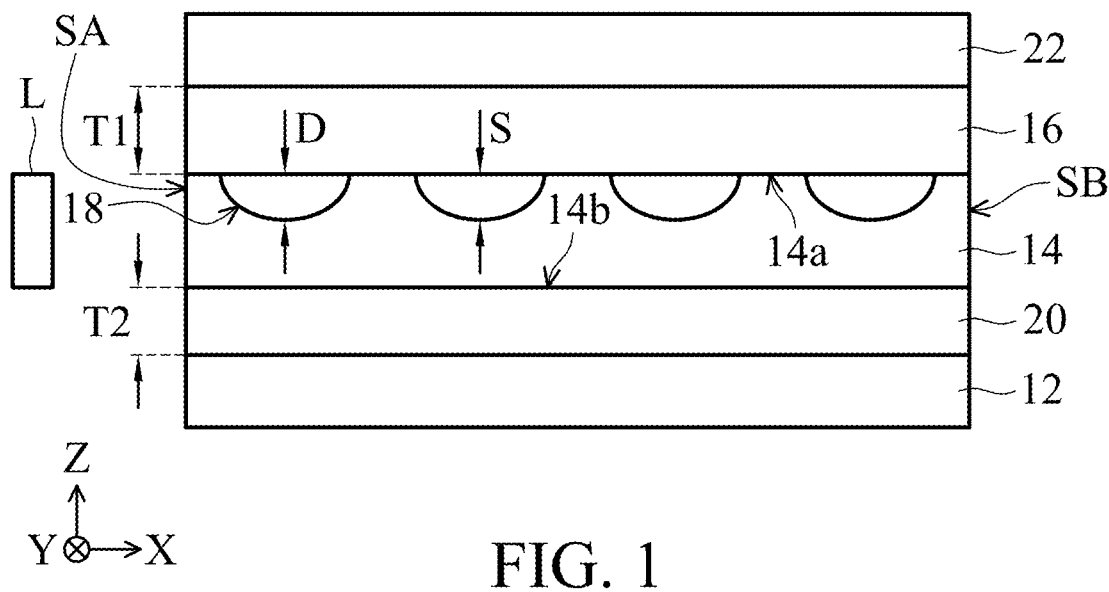
FIG. 1 shows a schematic cross-sectional view of an electronic device in accordance with one embodiment of the present disclosure.

The following description lists various embodiments of this disclosure to introduce the basic concepts of this case, and is not intended to limit the content of this case. The actual scope of the invention should be defined according to the scope of the patent application. Reference will now be made in detail to exemplary embodiments of the present disclosure, examples of which are illustrated in the accompanying drawings. Whenever possible, the same reference numbers are used in the drawings and descriptions to refer to the same or similar parts.

Throughout this disclosure and the appended claims, certain words are used to refer to specific components. Those skilled in the art will appreciate that the device manufacturers may refer to the same components by different names. This article is not intended to differentiate between components that have the same functionality but different names. In the following description and claims, the words "comprise", "include" and "contain" are open-ended words, and therefore they should be interpreted to mean "comprising but not limited to . . . "

The directional terms mentioned in this article, such as: "up", "down", "front", "back", "left", "right", etc., are only for reference to the directions of the accompanying drawings. The directional terms in this paper are used to define the relative positions of the illustrated components, and are not intended to limit the disclosure. In the drawings, each figure illustrates the general features of methods, structures, and/or materials used in particular embodiments. However, these drawings should not be interpreted as defining or limiting the scope or nature encompassed by these embodiments. For example, the relative sizes, thicknesses, and locations of the different layers, regions, and/or structures may be shrunken or enlarged for clarity.

In this paper, one structure (or layer, or component, or substrate) located on/above another structure (or layer, or component, or substrate) may mean that the two structures are directly connected, or the two structures are adjacent but not directly connected. Indirect connection means that there is at least one intermediary structure (or intermediary layer, intermediary component, intermediary substrate, intermediary spacer) between two structures. The lower surface of upper structure is adjacent to or directly connected to the upper surface of the intermediary structure. The upper surface of the lower structure is adjacent to or directly connected to the lower surface of the intermediate structure. The intermediary structure may be a single-layer/multi-layer physical structure, or a non-physical structure (there is no limit). In this disclosure, when a structure is disposed "on" another structure, it may mean that the structure is "directly" on the other structure, or that the structure is "indirectly" on the other structure (that is, between the two structures, at least one other structure is also sandwiched.

The terms "about", "equal to", "the same", "substantially" or "roughly" are generally interpreted to mean an offset within 20% of a given value or range, or to mean an offset within 10%, 5%, 3%, 2%, 1% or 0.5% of a given value or range.

Furthermore, any two numerical values or directions used for comparison may have certain errors. If the first value is equal to the second value, it implies that there may be a tolerable error difference about 10%. If a first direction is perpendicular or approximately perpendicular to a second direction, the angle between the first direction and the second direction may be 80-100 degrees. If the first direction is parallel or substantially parallel to the second direction, the angle between the first direction and the second direction may be 0-10 degrees.

The ordinal numbers used in the description and claims, such as "first", "second", etc., are used for identification between components. They do not imply the existence of a component with the previous ordinal number. Such ordinal numbers do not represent the order of the components, or the order of manufacturing procedures. These ordinal numbers are used to clearly distinguish two components with the same naming. The ordinal numbers given to the components in the claims may be different from the ordinal numbers given to the components in the description. Accordingly, the first component in the description may be the second component in the claim.

In the disclosure, descriptions like "a given range is from a first value to a second value" or "a given range falls within the range between a first value and a second value" indicate that the given range includes the first value, the second value, and other values between them.

It should be understood that in the exemplary embodiments of the disclosure, the depth, thickness, width, or height of each component, or the gap or distance between components may be measured by an optical microscope (OM), a scanning electron microscope (SEM), a film thickness measurement device ($\alpha$-step), or an ellipsometer. In some exemplary embodiments, a cross-sectional structural image of a component may be captured by a scanning electron microscope, which also measures the depth, thickness, width or height of each component, or the gap or distance between components.

An electronic device may include an imaging device, a laminated device, a display device, a backlight device, an antenna device, an assembled device, a touch display, a curved display, or a free shape display, but not limited thereto. The electronic device may use display media like liquid crystal, light-emitting diodes, fluorescence, phosphor, or any other suitable display media, or a combination of the above, but it is not limited thereto. A display device may be a non-self-luminous display device or a self-luminous display device. An antenna device may be a liquid-crystal type antenna device or a non-liquid-crystal type antenna device. A sensing device may use sensors sensing capacitance, light, heat energy or ultrasonic waves, but it is not limited thereto. An assembled device may be an assembled display device or an assembled antenna device, but it is not limited thereto. It should be noted that the electronic device can be any combination of the above, but it is not limited thereto. The electronic device may be a bendable or flexible electronic device. It should be noted that the electronic device can be any combination of the above, but it is not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, a structural system, etc., to form the display device, antenna device or assembled device.

It should be noted that in the embodiments shown below, features in several different embodiments may be replaced, reorganized, or combined without departing from the spirit of the present disclosure. Features in various embodiments may be combined as long as they do not violate the spirit of the disclosure or conflict with each other.

Unless otherwise defined, all terms (including technical and scientific terms) used herein have the same meaning as commonly understood by one of ordinary skill in the art. It is understood that these terms, such as those defined in commonly used dictionaries, should be interpreted to have a meaning consistent with the relevant technology and the background or context of the present disclosure, and should not be interpreted in an idealized or overly formal manner (unless otherwise defined).

In addition, the word "adjacent" in the description and claims, for example, is used to describe mutual proximity and does not necessarily mean that they are in contact with each other.

In addition, descriptions such as "when . . ." or "at the moment" in this disclosure means a period of time, from prior to the event to later than the event. It is not limited to events happen just at the same time, which are announced in advance here. Furthermore, "disposed on" and other similar descriptions in this disclosure indicate the relative positions of objects, and do not limit to a physical contact between the objects, unless there are special limitations. Furthermore, when the present disclosure describe multiple functions, and the word "or" is used in listing the functions, it means that the functions can exist independently, but it does not exclude that multiple functions may exist at the same time.

In addition, words such as "electrically connected" or "coupled" in the description and claims not only refer to a direct electrical connection between the different objects, but also refer to an indirect electrical connection between the different objects. Electrical connection includes direct electrical connection, indirect electrical connection, or wireless communication between the different objects.

In this present disclosure, when "or" is used as a connective word between multiple elements, unless otherwise stated, the expressions of "and" and "or" are included.

In the present disclosure, when a certain element is disposed on another element, it means that the certain element may be disposed on a certain side of another element, such as but not limited to above, below, left, right, front, or back side. The two elements may not directly contact to each other.

Referring to FIG. 1, in accordance with one embodiment of the present disclosure, an electronic device 10 is provided. FIG. 1 is a schematic cross-sectional view of the electronic device 10.

As shown in FIG. 1, the electronic device 10 includes a panel 12, a light-guide plate 14 and an attachment member 16. The light-guide plate 14 is disposed on the panel 12. The light-guide plate 14 has a first surface 14a. The first surface 14a has a plurality of optical units 18. The attachment member 16 contacts a part of the first surface 14a of the light-guide plate 14. In some embodiments, the loss tangent (tan δ) at 30° C. of the attachment member 16 is greater than 0 and less than or equal to 1, but the present disclosure is not limited thereto.

In accordance with some embodiments, the panel 12 may include a reflective display or a semi-transflective display, but the present disclosure is not limited thereto. In accordance with some embodiments, the panel 12 may include a cholesteric liquid-crystal panel, an electrophoretic panel or other reflective panels, but the present disclosure is not limited thereto. It should be noted that the panel 12 may optionally include multiple sequentially stacked sub-panels (not shown). The panel 12 includes, for example, a plurality of cholesteric liquid-crystal sub-panels that respectively reflect different wavelengths, such as a blue cholesteric liquid-crystal sub-panel, a green cholesteric liquid-crystal sub-panel and/or a red cholesteric liquid-crystal sub-panel, but the present disclosure is not limited thereto. These sub-panels can be bonded to each other through other attachment members (not shown).

As shown in FIG. 1, the light-guide plate 14 has a second surface 14b opposite to the first surface 14a. The first surface 14a has the plurality of optical units 18, and the second surface 14b is adjacent to the panel 12, but the present disclosure is not limited thereto. In other words, the optical units 18 are located on the first surface 14a of the light-guide plate 14 away from the panel 12. In accordance with some embodiments, the first surface 14a of the light-guide plate 14 forms, for example, a plurality of recessed structures thereon. These recessed structures can be compared to the multiple optical units 18, but the present disclosure is not limited thereto. In accordance with some embodiments, the first surface 14a of the light-guide plate 14 may be provided with dot material (not shown) thereon. These dot materials (such as ink or other suitable materials) can be compared to the multiple optical units 18, but the present disclosure is not limited thereto. In accordance with some embodiments, the attachment member 16 is disposed between the light-guide plate 14 and a protective substrate 22, but the present disclosure is not limited thereto. Other functional components (such as touch components or optical components) or other attachment members may be selectively inserted between the light-guide plate 14 and the protective substrate 22. It should be noted that the above-mentioned attachment member 16 is defined as, for example, an attachment member that contacts the first surface 14a having the multiple optical units 18 of the light-guide plate 14. In accordance with some embodiments, the protective substrate 22 may include a rigid substrate (such as glass, plastic, ceramic or other suitable materials), but the present disclosure is not limited thereto. In accordance with some embodiments, other optical layers (not shown, such as anti-glare layers, anti-reflective layers, and anti-fouling layers) may be selectively provided on the protective substrate 22, but the present disclosure is not limited thereto. In accordance with some embodiments, a light-shielding layer (not shown) may be selectively disposed on the protective substrate 22, and the light-shielding layer (not shown) may be located, for example, in a peripheral area of the protective substrate 22. In accordance with some embodiments, the material of the attachment member 16 may include a light-transmissive material. In accordance with some embodiments, the material of the attachment member 16 may include acrylic-based polymers or other suitable materials. In accordance with some embodiments, the attachment member 16 may select non-light curing glue (such as non-UV curing glue). After the attachment member 16 is bonded to the light-guide plate 14, there is no need to perform any curing step on the attachment member 16, but the present disclosure is not limited thereto.

In accordance with some embodiments, the storage modulus at 30° C. of the attachment member 16 (for example, hard glue) is, for example, greater than or equal to 10 Kpa and less than or equal to 2,000 Kpa, but the present disclosure is not limited thereto. In accordance with some embodiments, the storage modulus at 30° C. of the attachment member 16 is greater than or equal to 50 Kpa and less than or equal to 1,000 Kpa, but the present disclosure is not limited thereto. In accordance with some embodiments, the storage modulus at 30° C. of the attachment member 16 is greater than or equal to 60 Kpa and less than or equal to 800 Kpa, but the present disclosure is not limited thereto. In accordance with some embodiments, the storage modulus at 30° C. of the attachment member 16 is greater than or equal to 70 Kpa and less than or equal to 730 Kpa, but the present disclosure is not limited thereto.

In accordance with some embodiments, the loss modulus at 30° C. of the attachment member 16 is greater than or equal to 5 Kpa and less than or equal to 300 Kpa, but the present disclosure is not limited thereto. In accordance with some embodiments, the loss modulus at 30° C. of the attachment member 16 is greater than or equal to 10 Kpa and less than or equal to 250 Kpa, but the present disclosure is not limited thereto. In accordance with some embodiments, the loss modulus at 30° C. of the attachment member 16 is greater than or equal to 15 Kpa and less than or equal to 200 Kpa, but the present disclosure is not limited thereto. In accordance with some embodiments, the loss modulus at 30° C. of the attachment member 16 is greater than or equal to 20 Kpa and less than or equal to 165 Kpa, but the present disclosure is not limited thereto. When the attachment member 16 is made of hard glue (that is, glue without fluidity), the attachment member 16 does not need to be cured. Therefore, the storage modulus and the loss modulus of the attachment member 16 are measured, for example, using an uncured attachment member.

In accordance with some embodiments, the loss tangent (tan δ) at 30° C. of the attachment member 16 is greater than 0 and less than or equal to 1, but the present disclosure is not limited thereto. In accordance with some embodiments, the loss tangent (tan δ) at 30° C. of the attachment member 16 is greater than 0 and less than or equal to 0.5, but the present disclosure is not limited thereto. In accordance with some embodiments, the loss tangent (tan δ) at 30° C. of the attachment member 16 is greater than 0 and less than or equal to 0.3, but the present disclosure is not limited thereto. When the attachment member 16 is made of hard glue (that is, glue without fluidity), the attachment member 16 does not need to be cured. Therefore, the loss tangent (tan δ) of the attachment member 16 is measured, for example, using an uncured attachment member. In the present disclosure, a dynamic mechanical analyzer (DMA) is used to measure the parameters of the material of the attachment member, three parameter values can be obtained: loss tangent (tan δ), loss modulus and storage modulus. The relationship between the three parameter values of loss tangent, loss modulus and storage modulus is as follows.

Loss tangent (tan δ)=Loss modulus/Storage modulus

Through the range design of storage modulus, loss modulus and/or loss tangent of the above-mentioned attachment member 16, it can reduce the attachment member to fill the dots of the light-guide plate, and reduce the light-guide effect of the light-guide plate to be affected by the attachment member to darken the picture.

As shown in FIG. 1, one of the optical units 18 has a depth D (e.g., the depth of the recessed structure), and the attachment member 16 has a thickness T1. In accordance with some embodiments, the depth D is, for example, greater than or equal to 0.1 μm and less than or equal to 30 μm, but the present disclosure is not limited thereto. In accordance with some embodiments, the depth D is, for example, greater than or equal to 0.1 μm and less than or equal to 25 μm, but the present disclosure is not limited thereto. In accordance with some embodiments, the depth D is, for example, greater than or equal to 0.1 μm and less than or equal to 20 μm, but the present disclosure is not limited thereto. In accordance with some embodiments, the depth D is, for example, greater than or equal to 0.1 μm and less than or equal to 15 μm, but the present disclosure is not limited thereto. In accordance with some embodiments, the thickness T1 of the attachment member 16 is greater than or equal to 25 μm and less than or equal to 300 μm, but the present disclosure is not limited thereto. In accordance with some embodiments, the thickness T1 of the attachment member 16 is greater than or equal to 25 μm and less than or equal to 250 μm, but the present disclosure is not limited thereto. In accordance with some embodiments, the thickness T1 of the attachment member 16 is greater than or equal to 25 μm and less than or equal to 200 μm, but the present disclosure is not limited thereto. In accordance with some embodiments, the ratio of depth D to thickness T1 of the attachment member 16 is greater than or equal to 0.0001 and less than or equal to 30,000, but the present disclosure is not limited thereto. In accordance with some embodiments, the ratio of depth D to thickness T1 of the attachment member 16 is greater than or equal to 0.001 and less than or equal to 8,000 (or 3,000), but the present disclosure is not limited thereto. In accordance with some embodiments, the ratio of depth D to thickness T1 of the attachment member 16 is greater than or equal to 0.01 and less than or equal to 300 (or 200), but the present disclosure is not limited thereto. In accordance with some embodiments, the ratio of depth D to thickness T1 of the attachment member 16 is greater than or equal to 0.1 and less than or equal to 30 (or 20), but the present disclosure is not limited thereto. In accordance with some embodiments, the ratio of depth D to thickness T1 of the attachment member 16 is greater than or equal to 0.1 and less than or equal to 1, but the present disclosure is not limited thereto. In accordance with some embodiments, the ratio of depth D to thickness T1 of the attachment member 16 is greater than or equal to 0.01 and less than or equal to 0.33, but the present disclosure is not limited thereto. The depth D can be defined as the maximum depth of an optical unit 18 (e.g., a recessed structure) in the top view direction (Z direction) of the electronic device. The thickness T1 of the attachment member 16 can be defined as the average of the thicknesses of the attachment member 16 at any three locations in the top view direction (Z direction) of the electronic device. Through the design of the above-mentioned ratio range of the depth D and the thickness T1 of the attachment member 16, both optical and attachment yields can be taken into consideration.

Figure 2:
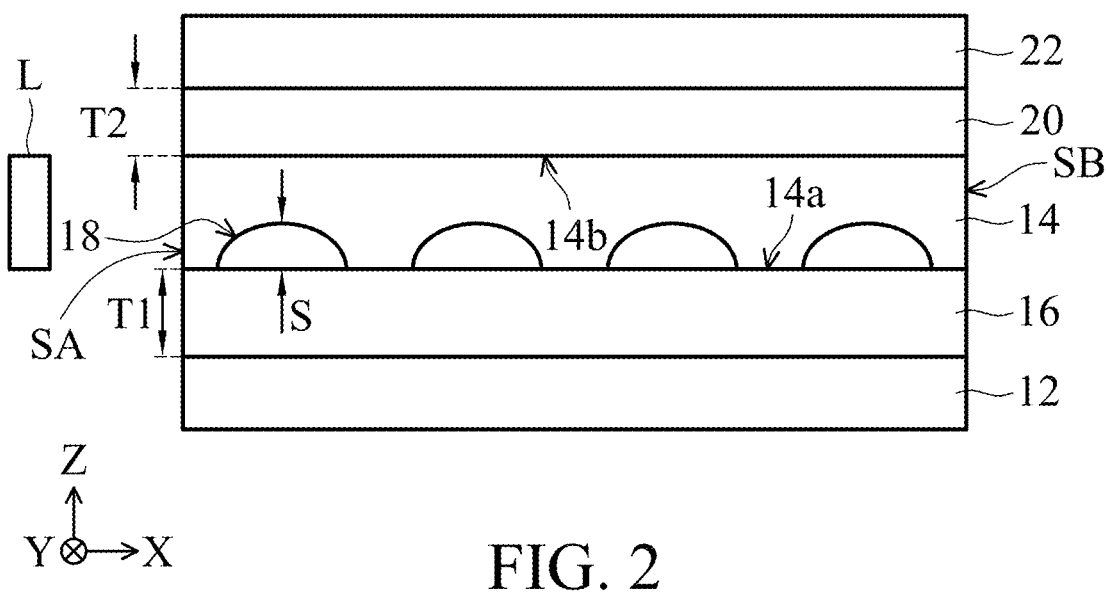
FIG. 2 shows a schematic cross-sectional view of an electronic device in accordance with one embodiment of the present disclosure.

In accordance with some embodiments (as shown in FIG. 2), the attachment member 16 is separated from the at least one of the plurality of optical units 18 by a gap S. The gap S can be defined as the maximum distance between the attachment member 16 and the optical unit 18 (e.g., the recessed structure) in the top view direction (Z direction) of the electronic device. In accordance with some embodiments, the gap S is, for example, greater than 0 and less than or equal to the depth D, but the present disclosure is not limited thereto. In accordance with some embodiments, the ratio of gap S to depth D of one of the multiple optical units 18 is, for example, greater than or equal to 0.2 and less than or equal to 1 (i.e. 0.2≤S/D≤1), but the present disclosure is not limited thereto. In accordance with some embodiments, the ratio of gap S to depth D of one of the multiple optical units 18 is, for example, greater than or equal to 0.3 and less than or equal to 1 (i.e. 0.3≤S/D≤1), but the present disclosure is not limited thereto. In accordance with some embodiments, the ratio of gap S to depth D of one of the multiple optical units 18 is, for example, greater than or equal to 0.5 and less than or equal to 1 (i.e. 0.5≤S/D≤1), but the present disclosure is not limited thereto. Through the design of the above-mentioned ratio range of the gap S and depth D, it is helpful to guide the light source to the panel through the light-guide plate, taking into account both optical and attachment yields.

In accordance with some embodiments, the attachment member 16 has a transmittance less than or equal to 20% (or 15%) with respect to a light with a wavelength ranging from 380 nm to 430 nm (380 nm≤wavelength≤430 nm), but the present disclosure is not limited thereto. In accordance with some embodiments, the transmittance of the attachment member 16 is less than or equal to 20% (or 15%) with respect to a light with a wavelength in the range of ultraviolet light (for example, 20 nm≤wavelength<380 nm, but not limited thereto), but the present disclosure is not limited thereto. In accordance with some embodiments, the transmittance of the attachment member 16 is less than or equal to 20% (or 15%) with respect to a light with a wavelength less than or equal to 430 nm (wavelength ≤430 nm), but the present disclosure is not limited thereto. For example, the transmittance of the attachment member 16 is less than or equal to 20% (or 15%) with respect to a light with a wavelength less than or equal to 420 nm (wavelength≤420 nm), but the present disclosure is not limited thereto. For example, the transmittance of the attachment member 16 is less than or equal to 20% (or 15%) to a light with a wavelength less than or equal to 400 nm (wavelength≤400 nm), but the present disclosure is not limited thereto. For example, the transmittance of the attachment member 16 is less than or equal to 20% (or 15%) with respect to a light with a wavelength less than or equal to 380 nm (wavelength≤380 nm), but the present disclosure is not limited thereto. Through the design of the transmittance of the above-mentioned attachment member 16 in different wavelength ranges, the possibility of the panel being affected by short-wavelength light (such as ultraviolet light or other light) and thus degrading the materials in the panel can be reduced.

In accordance with some embodiments, the loss tangent at 95° C. of the attachment member 16 is greater than or equal to 0.1 and less than or equal to 1, and the loss tangent at 95° C. of the attachment member 16 is greater than the loss tangent at 30° C. of the attachment member 16, but the present disclosure is not limited thereto. In accordance with some embodiments, the loss tangent at 95° C. of the attachment member 16 is greater than or equal to 0.15 and less than or equal to 0.9, but the present disclosure is not limited thereto. In accordance with some embodiments, the loss tangent at 95° C. of the attachment member 16 is greater than or equal to 0.15 and less than or equal to 0.7, but the present disclosure is not limited thereto. In accordance with some embodiments, the loss tangent at 95° C. of the attachment member 16 is greater than or equal to 0.15 and less than or equal to 0.6, but the present disclosure is not limited thereto. When the attachment member 16 is made of hard glue (that is, glue without fluidity), the attachment member 16 does not need to be cured. Therefore, the loss tangent (tan δ) of the attachment member 16 is measured, for example, using an uncured attachment member.

As shown in FIG. 1, the electronic device 10 further includes an attachment member 20 disposed between the panel 12 and the light-guide plate 14. In accordance with some embodiments, the material of the attachment member 20 may include acrylic-based polymers. In accordance with some embodiments, the thickness T2 of the attachment member 20 is greater than or equal to 100 μm and less than or equal to 300 μm, but the present disclosure is not limited thereto. In accordance with some embodiments, the thickness T2 of the attachment member 20 is greater than or equal to 100 μm and less than or equal to 250 μm, but the present disclosure is not limited thereto. In accordance with some embodiments, the transmittance of the attachment member 20 is less than or equal to 20% (or 15%) with respect to a light with a wavelength ranging from 380 nm to 430 nm (380 nm≤wavelength ≤430 nm), but the present disclosure is not limited thereto. In accordance with some embodiments, the transmittance of the attachment member 20 is less than or equal to 20% (or 15%) with respect to a light with a wavelength in the range of ultraviolet light (for example, 20 nm≤wavelength<380 nm, but not limited thereto), but the present disclosure is not limited thereto. In accordance with some embodiments, the transmittance of the attachment member 20 is less than or equal to 20% (or 15%) with respect to a light with a wavelength less than or equal to 430 nm (wavelength≤430 nm), but the present disclosure is not limited thereto. For example, the transmittance of the attachment member 20 is less than or equal to 20% (or 15%) with respect to a light with a wavelength less than or equal to 420 nm (wavelength≤420 nm), but the present disclosure is not limited thereto. For example, the transmittance of the attachment member 20 is less than or equal to 20% (or 15%) with respect to a light with a wavelength less than or equal to 400 nm (wavelength≤400 nm), but the present disclosure is not limited thereto. For example, the transmittance of the attachment member 20 is less than or equal to 20% (or 15%) with respect to a light with a wavelength less than or equal to 380 nm (wavelength≤380 nm), but the present disclosure is not limited thereto. Through the design of the transmittance of the above-mentioned attachment member 20 in different wavelength ranges, the possibility of the panel being affected by short-wavelength light (such as ultraviolet light or other light) and thus degrading the materials in the panel can be reduced.

In accordance with some embodiments, the transmittance of at least one of the attachment members 16 and 20 is less than or equal to 20% (or 15%) with respect to a light with a wavelength less than or equal to 430 nm (wavelength≤430 nm), but the present disclosure is not limited thereto. In accordance with some embodiments, the transmittance of at least one of the attachment members 16 and 20 is less than or equal to 20% (or 15%) with respect to a light with a wavelength less than or equal to 420 nm (or 400 nm, or 390 nm, or 380 nm), but the present disclosure is not limited thereto. When short-wavelength light (such as ultraviolet light or other light) is irradiated, the panel 12 (such as the contained liquid crystal or other material layers) may be subject to the risk of deterioration. Therefore, in the present disclosure, by configuring the attachment members (for example, at least one of the attachment members 16 and 20) capable of reducing short wavelengths (such as ultraviolet light) provided on the panel 12, the anti-ultraviolet light function of the electronic device is increased, thereby increasing the efficiency of the panel. In accordance with some embodiments, the above-mentioned attachment members can also optionally have the effect of reducing IR light.

Referring to FIG. 2, in accordance with one embodiment of the present disclosure, an electronic device 10 is provided. FIG. 2 is a schematic cross-sectional view of the electronic device 10.

The difference between the embodiment shown in FIG. 2 and the embodiment shown in FIG. 1 mainly lies in the light-guide plate 14, the attachment member 16, and the different arrangement methods and positions of the attachment member 20, which will be further described below. In FIG. 2, the remaining parts are similar to those disclosed in FIG. 1 and will not be repeated here.

As shown in FIG. 2, the electronic device 10 includes a panel 12, a light-guide plate 14 and an attachment member 16, but the present disclosure is not limited thereto. The light-guide plate 14 (a front light-guide plate) is disposed on the panel 12, for example. The light-guide plate 14 has a first surface 14a. The first surface 14a has a plurality of optical units 18. The attachment member 16 is, for example, in contact with a part of the first surface 14a of the light-guide plate 14. The loss tangent (tan δ) at 30° C. of the attachment member 16 is greater than 0 and less than or equal to 1, but the present disclosure is not limited thereto. As shown in FIG. 2, the light-guide plate 14 has a second surface 14b opposite to the first surface 14a. The first surface 14a has the plurality of optical units 18, and the first surface 14a is adjacent to the panel 12. An attachment member 20 is disposed between the second surface 14b of the light-guide plate 14 and a protective substrate 22, but the present disclosure is not limited thereto. In other words, the attachment member 16 is disposed between the light-guide plate 14 and the panel 12. Other functional components (such as touch components or optical components) or other attachment members may be selectively inserted between the light-guide plate 14 and the protective substrate 22. It should be noted that the above-mentioned attachment member 16 is defined as, for example, an attachment member that contacts the first surface 14a having the multiple optical units 18 of the light-guide plate 14. Materials, characteristics, dimensions, etc. of each component (such as the attachment member 16, the attachment member 20, the light-guide plate 14, but not limited thereto) in FIG. 2 can be referred to the description in FIG. 1, for example.

In addition, as shown in FIG. 2, the attachment member 16 is separated from the at least one of the plurality of optical units 18 by a gap S. In accordance with some embodiments, the gap S is, for example, greater than 0 and less than or equal to the depth D, but the present disclosure is not limited thereto. In accordance with some embodiments, the ratio of gap S to depth D is, for example, greater than or equal to 0.2 and less than or equal to 1 (i.e. $0.2 \leq S/D \leq 1$), but the present disclosure is not limited thereto. In accordance with some embodiments, the ratio of gap S to depth D is, for example, greater than or equal to 0.3 and less than or equal to 1 (i.e. $0.3 \leq S/D \leq 1$), but the present disclosure is not limited thereto. In accordance with some embodiments, the ratio of gap S to depth D is, for example, greater than or equal to 0.5 and less than or equal to 1 (i.e. $0.5 \leq S/D \leq 1$), but the present disclosure is not limited thereto. Through the design of the above-mentioned ratio range of the gap S and depth D, it is helpful to guide the light source to the panel through the light-guide plate, taking into account both optical and attachment yields.

Figure 3:
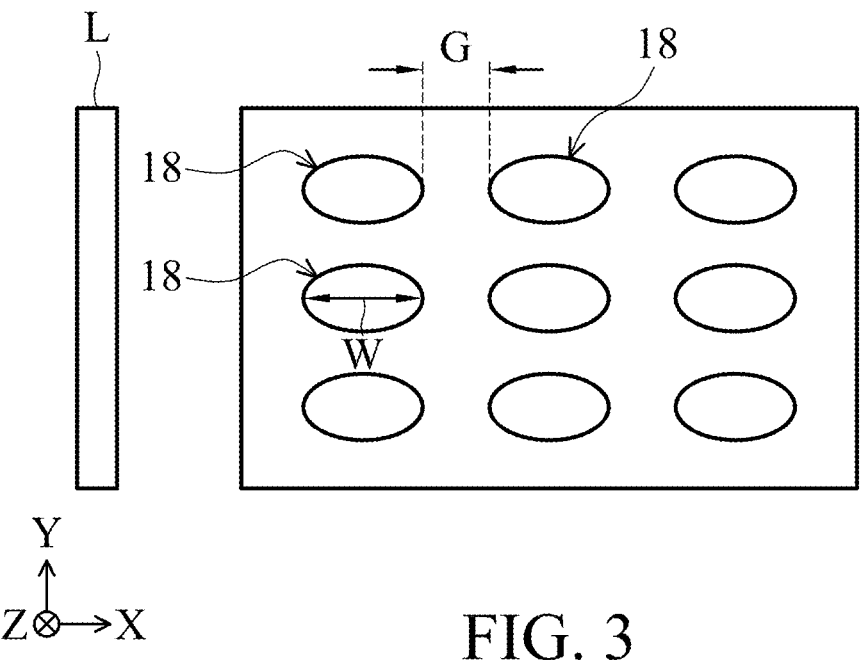
FIG. 3 shows a schematic top view of some components in an electronic device in accordance with one embodiment of the present disclosure.

Referring to FIG. 3, the structure of the light-guide plate 14 is further described. FIG. 3 shows a schematic top view of some components (for example, the light-guide plate 14) in the electronic device 10.

A shown in FIG. 3, the light-guide plate 14 has a plurality of optical units 18. In accordance with some embodiments, the shape of the optical unit 18 may include an elliptical shape, a circular shape, or an irregular shape, but the present disclosure is not limited thereto. In accordance with some embodiments, the (maximum) width W of the optical unit 18 may be greater than or equal to 0.1 μm and less than or equal to 300 μm, but the present disclosure is not limited thereto. In FIG. 3, for example, the (maximum) width W of the optical unit 18 is along the X direction, but the present disclosure is not limited thereto. In other embodiments (not shown), the (maximum) width W of the optical unit 18 may also be along other directions (any direction perpendicular to the Z direction). In accordance with some embodiments, the (maximum) width W of the optical unit 18 may be greater than or equal to 0.1 μm and less than or equal to 250 μm (or 200 μm), but the present disclosure is not limited thereto. In accordance with some embodiments, the depth D may be greater than or equal to 0.1 μm and less than or equal to 30 μm, but the present disclosure is not limited thereto. In accordance with some embodiments, the depth D may be greater than or equal to 0.1 μm and less than or equal to 25 μm (or 20 μm), but the present disclosure is not limited thereto. In accordance with some embodiments, the ratio of depth to width of the optical unit 18 is greater than or equal to 0.1 and less than or equal to 30, but the present disclosure is not limited thereto. In accordance with some embodiments, the ratio of depth to width of the optical unit 18 is greater than or equal to 0.1 and less than or equal to 25 (or 20), but the present disclosure is not limited thereto. Through the design of the above-mentioned ratio of depth to width of the optical unit 18, a better light-guide effect can be achieved.

In accordance with some embodiments, in the light-guide plate 14, adjacent optical units 18 are separated by a minimum gap G. In accordance with some embodiments, the minimum gap G is greater than or equal to 0.1 μm and less than or equal to 10,000 μm, but the present disclosure is not limited thereto. In accordance with some embodiments, the minimum gap G is greater than or equal to 0.1 μm and less than or equal to 8,000 μm (or 6,000 μm, or 5,000 μm), but the present disclosure is not limited thereto. In accordance with some embodiments, the minimum gap G is greater than or equal to 1 μm and less than or equal to 800 μm (or 600 μm, or 500 μm), but the present disclosure is not limited thereto. In accordance with some embodiments, the minimum gap G is greater than or equal to 10 μm and less than or equal to 100 μm, but the present disclosure is not limited thereto. In accordance with some embodiments, the minimum gap G is greater than or equal to 15 μm (or 30 μm) and less than or equal to 80 μm (or 60 μm, or 50 μm), but the present disclosure is not limited thereto. In accordance with some embodiments, the ratio of minimum gap G to thickness T1 of the attachment member 16 is greater than or equal to 0.0001 and less than or equal to 50,000, but the present disclosure is not limited thereto. In accordance with some embodiments, the ratio of minimum gap G to thickness T1 of the attachment member 16 is greater than or equal to 0.001 (or 0.01) and less than or equal to 10,000 (or 8,000, or 6,000, or 5,000, or 3,000, or 500, or 100, or 50), but the present disclosure is not limited thereto. In accordance with some embodiments, the ratio of minimum gap G to thickness T1 of the attachment member 16 is greater than or equal to 0.1 and less than or equal to 5, but the present disclosure is not limited thereto. In accordance with some embodiments, the ratio of minimum gap G to thickness T1 of the attachment member 16 is greater than or equal to 0.1 and less than or equal to 3, but the present disclosure is not limited thereto. The light-guide plate 14 has a light-incident side SA and an opposite side SB relative to the light-incident side SA. The light source L is adjacent to the light-incident side SA. In accordance with some embodiments, the light-guide plate 14 is divided into approximately five parts with equal proportions (for example, equal width) along the X direction. It is divided into part 1 to part 5 in order from the light-incident side SA to the opposite side SB. In part 3, the minimum gaps measured from two adjacent optical units 18 in three groups can be selected and averaged to obtain the minimum gap G.

Through the design of the above-mentioned ratio range of the minimum gap G and the thickness T1 of the attachment member 16, both optical and attachment yields can be taken into consideration. In accordance with some embodiments, the dimension (e.g., width, depth or appearance) of the optical unit 18 adjacent to the light source L (i.e., adjacent to the light-incident side SA) and the optical unit 18 located far away from the light source L (i.e., adjacent to the opposite side SB) in the light-guide plate 14 may be approximately the same, but the present disclosure is not limited thereto. In accordance with some embodiments, the dimension (e.g., width, depth or appearance) of the optical unit 18 adjacent to the light source L (i.e., adjacent to the light-incident side SA) and the optical unit 18 located far away from the light source L (i.e., adjacent to the opposite side SB) in the light-guide plate 14 may be different, but the present disclosure is not limited thereto. In accordance with some embodiments, the minimum gap G between two adjacent optical units 18 adjacent to the light source L (i.e., adjacent to the light-incident side SA) and the minimum gap G between two adjacent optical units 18 located far away from the light source L (i.e., adjacent to the opposite side SB) in the light-guide plate 14 may be different, but the present disclosure is not limited thereto. As mentioned above, it is divided into parts 1 to 5 in equal proportions from the light-incident side SA to the opposite side SB. The minimum gap G between two adjacent optical units 18 located in part 1 may be different from the minimum gap G between two adjacent optical units 18 located in part 5. For example, the minimum gap G between two adjacent optical units 18 located in part 1 may be greater than the minimum gap G between two adjacent optical units 18 located in part 5, whereby the light can be directed to the panel more uniformly, but the present disclosure is not limited thereto. In accordance with some embodiments, the density of the optical units 18 adjacent to the light source L (i.e., adjacent to the light-incident side SA) and the density of the optical units 18 far away from the light source L (i.e., adjacent to the opposite side SB) in the light-guide plate 14 may be different, but the present disclosure is not limited thereto. As mentioned above, it is divided into parts 1 to 5 in equal proportions from the light-incident side SA to the opposite side SB. The density of the optical units 18 located in part 1 may be different from the density of the optical units 18 located in part 5. For example, the density of the optical unit 18 located in part 1 may be less than the density of the optical unit 18 located in part 5, whereby the light can be directed to the panel more uniformly, but the present disclosure is not limited thereto. In accordance with some embodiment (not shown), the thickness of the light-guide plate 14 adjacent to the light source L (i.e., adjacent to the light-incident side SA) and the thickness of the light-guide plate 14 away from the light source L (i.e., adjacent to the opposite side SB) may be the same or different.

Figure 4:
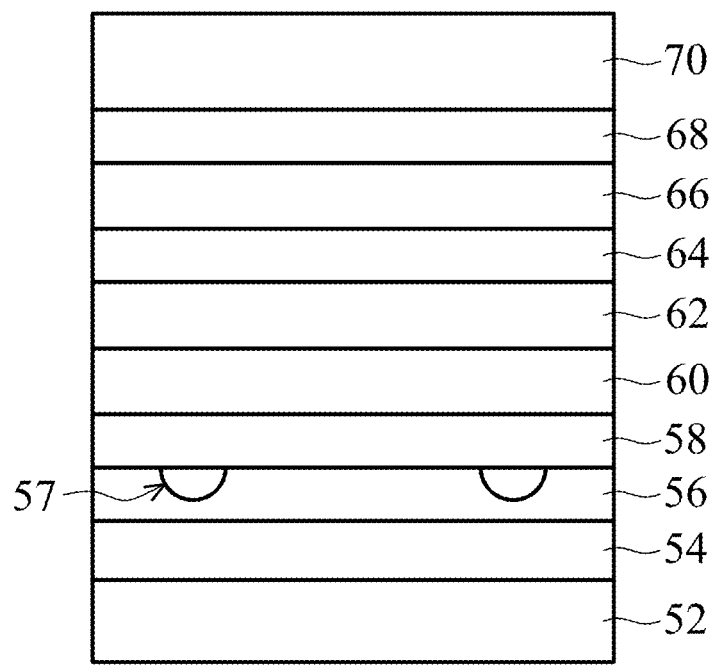
FIG. 4 shows a schematic cross-sectional view of an electronic device in accordance with one embodiment of the present disclosure.

Referring to FIG. 4, in accordance with one embodiment of the present disclosure, an electronic device 50 is provided. FIG. 4 is a schematic cross-sectional view of the electronic device 50. Materials, characteristics, dimensions, etc. of similar components (such as the light-guide plate, the panel, the protective substrate, and the attachment member) in FIG. 4 can be referred to the description in FIG. 1, for example.

As shown in FIG. 4, the electronic device 50 is provided with a panel 52, an attachment member 54, a light-guide plate 56, an attachment member 58, an attachment member 60, a touch layer 62 (for example, an ITO film, but not limited thereto), an attachment member 64, a touch layer 66 (for example, an ITO film, but not limited thereto), an attachment member 68, and a protective substrate 70 from bottom to top. For example, a capacitive touch component may be formed between the touch layer 62 and the touch layer 66. In accordance with some embodiments, one of the touch layer 62 and the touch layer 66 may, for example, transmit a sensing signal, and the other may, for example, receive a sensing signal. In accordance with some embodiments, the touch layer 62 and the touch layer 66 may optionally include a full-surface conductive layer (not shown) or a patterned touch conductive layer (not shown). In accordance with some embodiment (not shown), a transparent substrate (glass or other transparent substrate) may be provided between the touch layer 62 (such as an ITO film, but not limited thereto) and the touch layer 66 (such as an ITO film, but not limited thereto), but the present disclosure is not limited thereto. It should be noted that any one of the above components may be selectively removed, or other components may be inserted between these components. The light-guide plate 56 has a plurality of optical units 57 on a side away from the panel 52. The attachment member 58 contacts the surface having the plurality of optical units 57 of the light-guide plate 56. The loss tangent (tan δ) at 30° C. of the attachment member 58 is greater than 0 and less than or equal to 1. For detailed description of the attachment member 58, please refer to the above attachment member 16, and the description will not be repeated. When the attachment member 58 is made of hard glue (that is, glue without fluidity), the attachment member 58 does not need to be cured. Therefore, the loss tangent (tan δ) of the attachment member 58 is measured, for example, using an uncured attachment member.

Similarly, the panel 52 may include a reflective display or a semi-transflective display.

In accordance with some embodiments, the materials of the attachment members 54, 60, 64, and 68 may include light-transmitting materials. The materials of these attachment members may be optionally the same as or different from the above-mentioned attachment member 20.

In accordance with some embodiments, the attachment member 58 is disposed between the attachment member 60 and the light-guide plate 56. The attachment member 60 is disposed between the touch layer 62 and the attachment member 58. In accordance with some embodiments, when the transmittance of the attachment member 60 is less than or equal to 20% (or 15%) with respect to a light with a wavelength ranging from 380 nm to 430 nm (380 nm≤wavelength≤430 nm), the attachment member 58 may optionally need not be designed to have a transmittance less than or equal to 20% (or 15%) with respect to a light with a wavelength in the range from 380 nm to 430 nm (380 nm≤wavelength≤430 nm). In accordance with some embodiments, when the transmittance of the attachment member 60 is less than or equal to 20% (or 15%) with respect to a light with a wavelength within the range of ultraviolet wavelengths (for example, 20 nm≤wavelength<380 nm), the attachment member 58 may optionally need not be designed to have a transmittance less than or equal to 20% (or 15%) with respect to a light with a wavelength in the range of ultraviolet wavelengths (for example, 20 nm≤wavelength<380 nm).

In accordance with some embodiments, the attachment members 60 and 58 may be made of different materials. The loss tangent (tan δ) at 30° C. of the attachment member 58 may be less than the loss tangent (tan δ) at 30° C. of the attachment member 60, but the present disclosure is not limited thereto. When the attachment member 58 is made of hard glue (that is, glue without fluidity), the attachment member 58 does not need to be cured. Therefore, the loss tangent (tan δ) of the attachment member 58 is measured, for example, using an uncured attachment member. When the attachment member 60 is made of soft glue (that is, glue with fluidity), the attachment member 60 may need to be cured, for example. Therefore, the loss tangent of the attachment member 60 is measured, for example, using a cured attachment member. In accordance with some embodiments, the thickness of the attachment member 60 is, for example, greater than or equal to the thickness of the attachment member 58, but the present disclosure is not limited thereto. In accordance with some embodiments, other base materials (not shown) may optionally be included between the attachment member 60 and the attachment member 58.

In accordance with some embodiments, the attachment member 54, the attachment member 64, and/or the attachment member 68 may be made of different materials from, for example, the attachment member 58 or the attachment member 60, but the present disclosure is not limited thereto. In accordance with some embodiments, the loss tangent (tan δ) at 30° C. of the attachment member 58 may be less than or equal to the loss tangent (tan δ) of the attachment member 54, the attachment member 64, and/or the attachment member 68, but the present disclosure is not limited thereto. It should be noted that when the above-mentioned attachment member (the attachment member 54, the attachment member 64, and/or the attachment member 68) is made of hard glue (that is, glue without fluidity), the above-mentioned attachment member does not need to be cured. Therefore, the loss tangent (tan δ) of the above-mentioned attachment member is measured, for example, using an uncured attachment member. When the above-mentioned attachment member (the attachment member 54, the attachment member 64, and/or the attachment member 68) is made of soft glue (that is, glue with fluidity), the above-mentioned attachment member may need to be cured, for example. Therefore, the loss tangent of the above-mentioned attachment member is measured, for example, using a cured attachment member.

In accordance with some embodiments, other optical layers (not shown, such as anti-glare layers, anti-reflective layers, and anti-fouling layers) may further be provided on the protective substrate 70, but the present disclosure is not limited thereto.

In accordance with some embodiments, an electronic device (not shown) is provided, and its structure is similar to the electronic device 50 shown in FIG. 4. The main difference between the two is that the electronic device is not provided with a touch component. For example, the touch layer 62 (such as an ITO film), the attachment member 64, the touch layer 66 (such as an ITO film), and the attachment member 68 in FIG. 4 are omitted. The rest are similar to those disclosed in FIG. 4 and will not be described again here.

Figure 5:
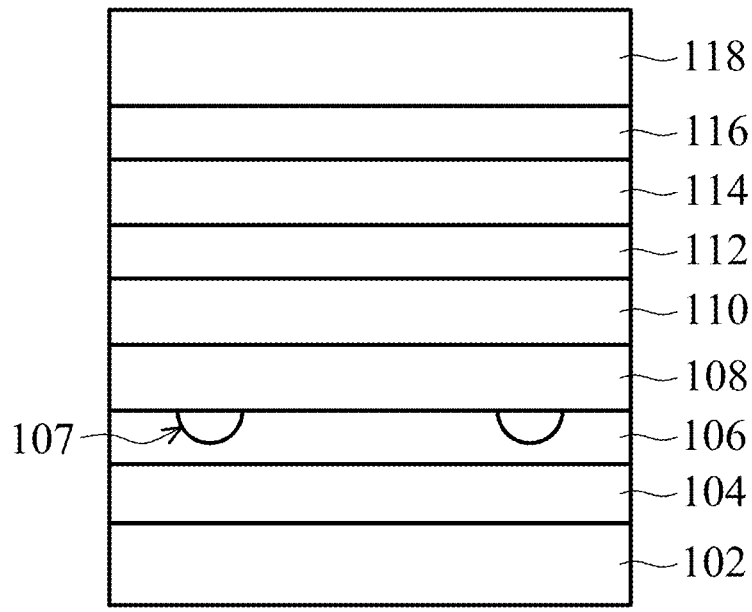
FIG. 5 shows a schematic cross-sectional view of an electronic device in accordance with one embodiment of the present disclosure.

Referring to FIG. 5, in accordance with one embodiment of the present disclosure, an electronic device 100 is provided. FIG. 5 is a schematic cross-sectional view of the electronic device 100. Materials, characteristics, dimensions, etc. of similar components (such as the light-guide plate, the panel, the protective substrate, and the attachment member) in FIG. 5 can be referred to the description in FIG. 1, for example.

As shown in FIG. 5, the electronic device 100 is provided with a panel 102, an attachment member 104, a light-guide plate 106, an attachment member 108, a touch layer 110 (e.g., an ITO film), an attachment member 112, a touch layer 114 (e.g., an ITO film), an attachment member 116 and a protective substrate 118 from bottom to top. For descriptions of the touch layer 110 (e.g., an ITO film) and the touch layer 114 (e.g., an ITO film), please refer to the above description of the touch layer 62 and the touch layer 66. The light-guide plate 106 has a plurality of optical units 107 on a side away from the panel 102. The attachment member 108 contacts the surface having the plurality of optical units 107 of the light-guide plate 106. The loss tangent (tan δ) at 30° C. of the attachment member 108 is greater than 0 and less than or equal to 1. For detailed description of the attachment member 108 and the measurement method of the loss tangent (tan δ), please refer to the above attachment member 16, and the description will not be repeated.

In accordance with some embodiments, the panel 102 may include a reflective display or a semi-transflective display.

In accordance with some embodiments, the materials of the attachment members 104, 108, 112, and 116 may include acrylic-based polymers or other suitable materials.

In accordance with some embodiments, the attachment member 104 is disposed between the panel 102 and the light-guide plate 106. When the transmittance of the attachment member 104 is less than or equal to 20% (or 15%) with respect to a light with a wavelength in a range from 380 nm to 430 nm (380 nm≤wavelength≤430 nm), the attachment member 108 may optionally need not be designed that a transmittance is less than or equal to 20% (or 15%) with respect to a light with a wavelength in the range from 380 nm to 430 nm (380 nm≤wavelength≤430 nm), but the present disclosure is not limited thereto. In accordance with some embodiments, when the transmittance of the attachment member 104 is less than or equal to 20% (or 15%) with respect to a light with a wavelength in the range of ultraviolet wavelengths (for example, 20 nm≤wavelength<380 nm), the attachment member 108 may optionally need not be designed to that a transmittance is less than or equal to 20% (or 15%) with respect to a light with a wavelength in a range from 20 nm to 380 nm (20 nm≤wavelength<380 nm), but the present disclosure is not limited thereto.

In accordance with some embodiments, the attachment members 104 and 108 may be made of different materials. The loss tangent (tan δ) at 30° C. of the attachment member 108 may be less than that of the attachment member 104, but the present disclosure is not limited thereto.

In accordance with some embodiments, the attachment member 112 and the attachment member 116 may be made of different materials from, for example, the attachment member 108 or the attachment member 104, but the present disclosure is not limited thereto. In accordance with some embodiments, the loss tangent (tan δ) at 30° C. of the attachment member 108 may be less than or equal to the loss tangent (tan δ) of the attachment member 112, the attachment member 116, and/or the attachment member 104, but the present disclosure is not limited thereto. In accordance with some embodiments, the attachment member 112 and the attachment member 116 may be made of the same material as, for example, the attachment member 108 or the attachment member 104. It should be noted that when the above-mentioned attachment member (the attachment member 112, the attachment member 116, the attachment member 108 or the attachment member 104) is made of hard glue (that is, glue without fluidity), the above-mentioned attachment member does not need to be cured. Therefore, the loss tangent (tan δ) of the above-mentioned attachment member is measured, for example, using an uncured attachment member. When the above-mentioned attachment member is made of soft glue (that is, glue with fluidity), the above-mentioned attachment member may need to be cured, for example. Therefore, the loss tangent of the above-mentioned attachment member is measured, for example, using a cured attachment member.

In accordance with some embodiments, other optical layers (not shown, such as anti-glare layers, anti-reflective layers, and anti-fouling layers) may further be provided on the protective substrate 118, but the present disclosure is not limited thereto.

Figure 6:
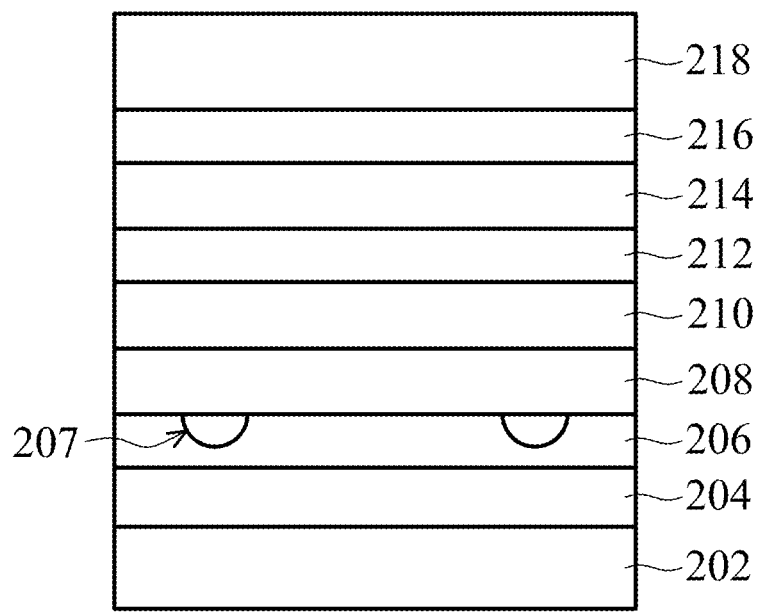
FIG. 6 shows a schematic cross-sectional view of an electronic device in accordance with one embodiment of the present disclosure.

Referring to FIG. 6, in accordance with one embodiment of the present disclosure, an electronic device 200 is provided. FIG. 6 is a schematic cross-sectional view of the electronic device 200. Materials, characteristics, dimensions, etc. of similar components (such as the light-guide plate, the panel, the protective substrate, and the attachment member) in FIG. 6 can be referred to the description in FIG. 1, for example.

As shown in FIG. 6, the electronic device 200 is provided with a panel 202, an attachment member 204, a light-guide plate 206, an attachment member 208, a touch layer 210 (e.g., an ITO film), an attachment member 212, a touch layer 214 (e.g., an ITO film), an attachment member 216, and a protective substrate 218 from bottom to top. For descriptions of the touch layer 210 (e.g., an ITO film) and the touch layer 214 (e.g., an ITO film), please refer to the above description of the touch layer 62 and the touch layer 66. The light-guide plate 206 has a plurality of optical units 207 on a side away from the panel 202. The attachment member 208 contacts the surface having the plurality of optical units 207 of the light-guide plate 206. The loss tangent (tan δ) at 30° C. of the attachment member 208 is greater than 0 and less than or equal to 1. Examples of materials, characteristics, or loss-tangent measurement methods of the attachment member 208 may refer to the aforementioned attachment member 16.

In accordance with some embodiments, the panel 202 may include a reflective display or a semi-transflective display.

In accordance with some embodiments, the materials of the attachment members 204, 208, 212, and 216 may include acrylic-based polymers or other suitable materials.

In accordance with some embodiments, the attachment member 216 is disposed between the touch layer 214 (e.g., an ITO film) and the protective substrate 218. In accordance with some embodiments, the transmittance of the attachment member 216 is less than or equal to 20% (or 15%) with respect to a light with a wavelength in a range from 380 nm to 430 nm (380 nm≤wavelength≤430 nm), but the present disclosure is not limited thereto. In accordance with some embodiments, the transmittance of the attachment member 216 is less than or equal to 20% (or 15%) with respect to a light with a wavelength in the range of ultraviolet light (20 nm≤wavelength<380 nm), but the present disclosure is not limited thereto. In other embodiments, the attachment member 212 disposed between the touch layer 214 (e.g., an ITO film) and the touch layer 210 (e.g., an ITO film) may selectively transmit less than or equal to 20% (or 15%) with respect to a light with a wavelength in a range from 380 nm to 430 nm (380 nm≤wavelength≤430 nm), but the present disclosure is not limited thereto.

In accordance with some embodiments, the attachment member 208 and the attachment member 216, and the attachment member 212 and/or the attachment member 204 may be made of different materials. In accordance with some embodiments, the loss tangent (tan δ) of the attachment member 208 at 30° C. may be less than the loss tangent (tan δ) of the attachment member 216, the attachment member 212, and/or the attachment member 204, but the present disclosure is not limited thereto. In accordance with some embodiments, the attachment member 208 and the attachment member 216, and the attachment member 212 and/or the attachment member 204 may be made of the same material. It should be noted that when the above-mentioned attachment member (the attachment member 208, the attachment member 216, the attachment member 212 or the attachment member 204) is made of hard glue (that is, glue without fluidity), the above-mentioned attachment member does not need to be cured. Therefore, the loss tangent (tan δ) of the above-mentioned attachment member is measured, for example, using an uncured attachment member. When the above-mentioned attachment member (the attachment member 208, the attachment member 216, the attachment member 212 or the attachment member 204) is made of soft glue (that is, glue with fluidity), the above-mentioned attachment member may need to be cured, for example. Therefore, the loss tangent of the above-mentioned attachment member is measured, for example, using a cured attachment member.

In accordance with some embodiments, other optical layers (not shown, such as anti-glare layers, anti-reflective layers, and anti-fouling layers) may further be provided on the protective substrate 218, but the present disclosure is not limited thereto.

Figure 7:
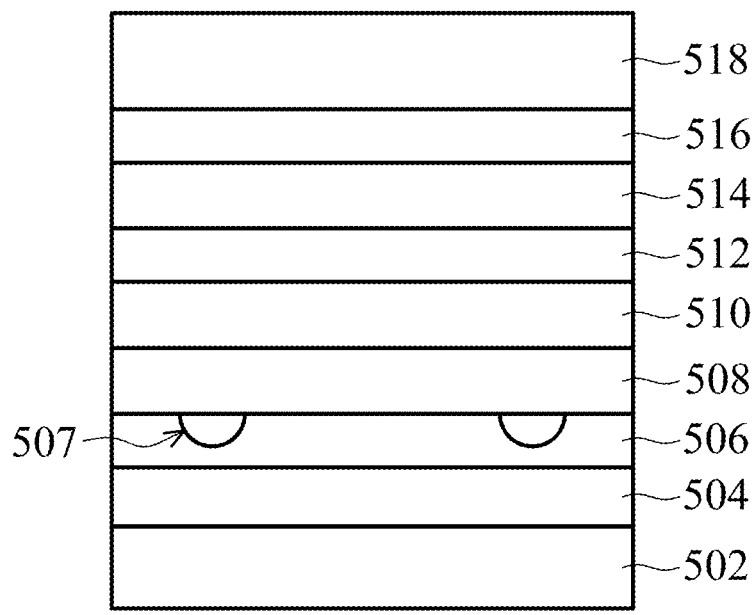
FIG. 7 shows a schematic cross-sectional view of an electronic device in accordance with one embodiment of the present disclosure.

Referring to FIG. 7, in accordance with one embodiment of the present disclosure, an electronic device 500 is provided. FIG. 7 is a schematic cross-sectional view of the electronic device 500. Materials, characteristics, dimensions, etc. of similar components (such as the light-guide plate, the panel, the protective substrate, and the attachment member) in FIG. 7 can be referred to the description in FIG. 1, for example.

As shown in FIG. 7, the electronic device 500 is provided with a panel 502, an attachment member 504, a light-guide plate 506, an attachment member 508, a touch layer 510 (such as an ITO film), an attachment member 512, a touch layer 514 (such as an ITO film), an attachment member 516 and a protective substrate 518 from bottom to top, but the present disclosure is not limited thereto. For descriptions of the touch layer 510 (e.g., an ITO film) and the touch layer 514 (e.g., an ITO film), please refer to the above description of the touch layer 62 and the touch layer 66. The light-guide plate 506 has a plurality of optical units 507 on a side away from the panel 502. The attachment member 508 contacts the surface having the plurality of optical units 507 of the light-guide plate 506. The loss tangent (tan δ) at 30° C. of the attachment member 508 is greater than 0 and less than or equal to 1. In accordance with some embodiments, the loss tangent at 30° C. of the attachment member 508 is greater than 0 and less than or equal to 0.5, or the loss tangent at 30° C. is greater than 0 and less than or equal to 0.3, but the present disclosure is not limited thereto.

The material or characteristics of the attachment member 508 may refer to the aforementioned attachment member 16.

In accordance with some embodiments, the panel 502 may include a reflective display or a semi-transflective display.

In accordance with some embodiments, the materials of the attachment members 504, 508, 512 and 516 may include acrylic-based polymers or other suitable materials.

In accordance with some embodiments, the loss tangent of the attachment member 508 is within the above range, and its transmittance is less than or equal to 20% (or less than 15%) with respect to a light with a wavelength in a range from 380 nm to 430 nm (380 nm≤wavelength≤430 nm). In accordance with some embodiments, the loss tangent of the attachment member 508 is within the above range, and its transmittance is less than or equal to 20% (or less than 15%) with respect to a light with a wavelength in the range of ultraviolet light wavelengths (20 nm≤wavelength<380 nm).

In accordance with some embodiments, the transmittance of the attachment member 504, the attachment member 512, and/or the attachment member 516 may be selectively less than or equal to 20% (or 15%) with respect to a light with a wavelength in a range from 380 nm to 430 nm (380 nm≤wavelength≤430 nm), but the present disclosure is not limited thereto.

In accordance with some embodiments, other optical layers (not shown, such as anti-glare layers, anti-reflective layers, and anti-fouling layers) may further be provided on the protective substrate 518, but the present disclosure is not limited thereto.

In accordance with some embodiments, an electronic device (not shown) is provided, and its structure is similar to the electronic device 500 shown in FIG. 7. The main difference between the two is that the electronic device does not have a touch component. For example, the touch layer 510 (e.g., an ITO film), the attachment member 512, the touch layer 514 (e.g., an ITO film), and the attachment member 516 in FIG. 7 are omitted. The rest are similar to those disclosed in FIG. 7 and will not be described again here.

EXAMPLES

Figure 8A:
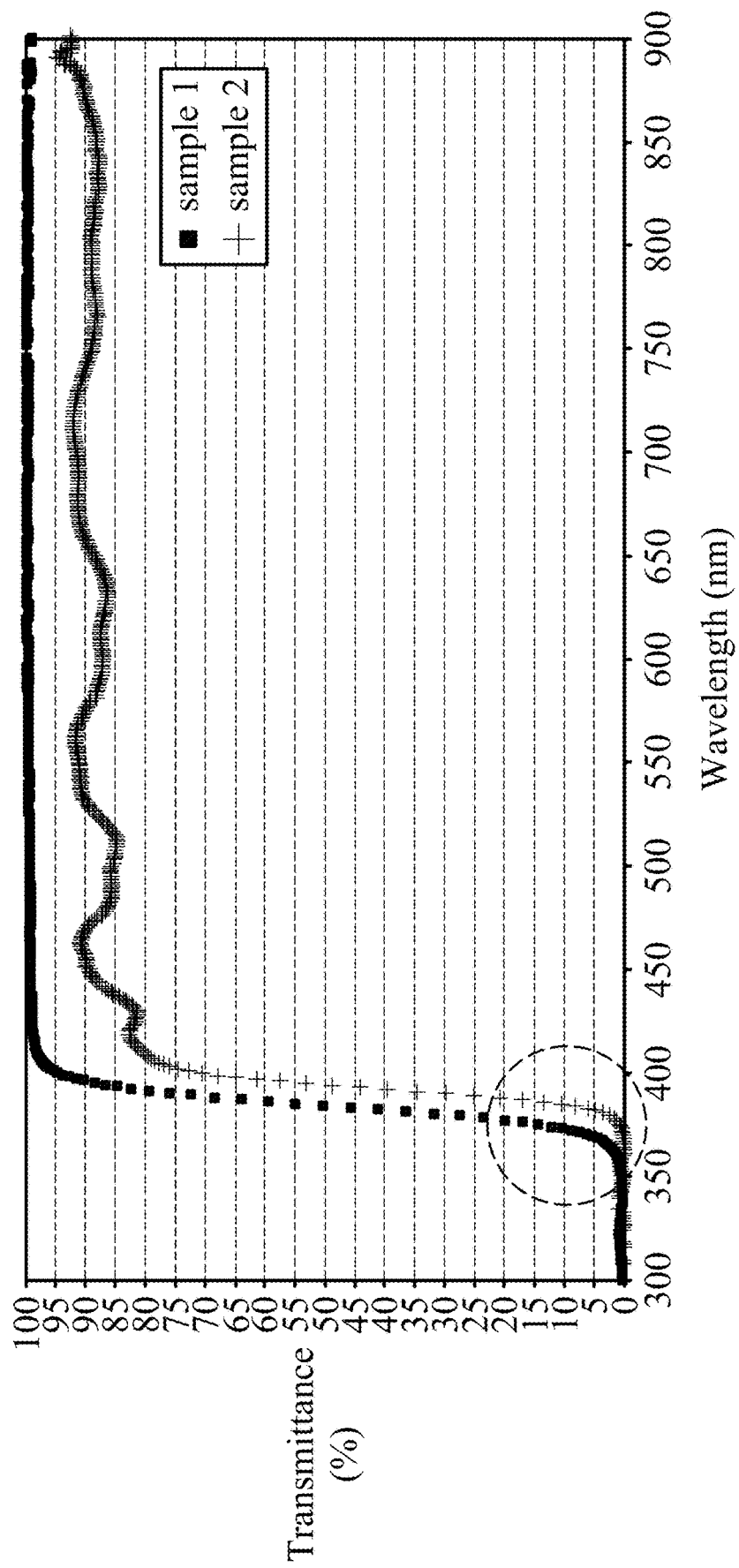
FIG. 8A shows alterations in transmittance of attachment members in an electronic device for different wavelengths in accordance with one embodiment of the present disclosure.
Figure 8B:
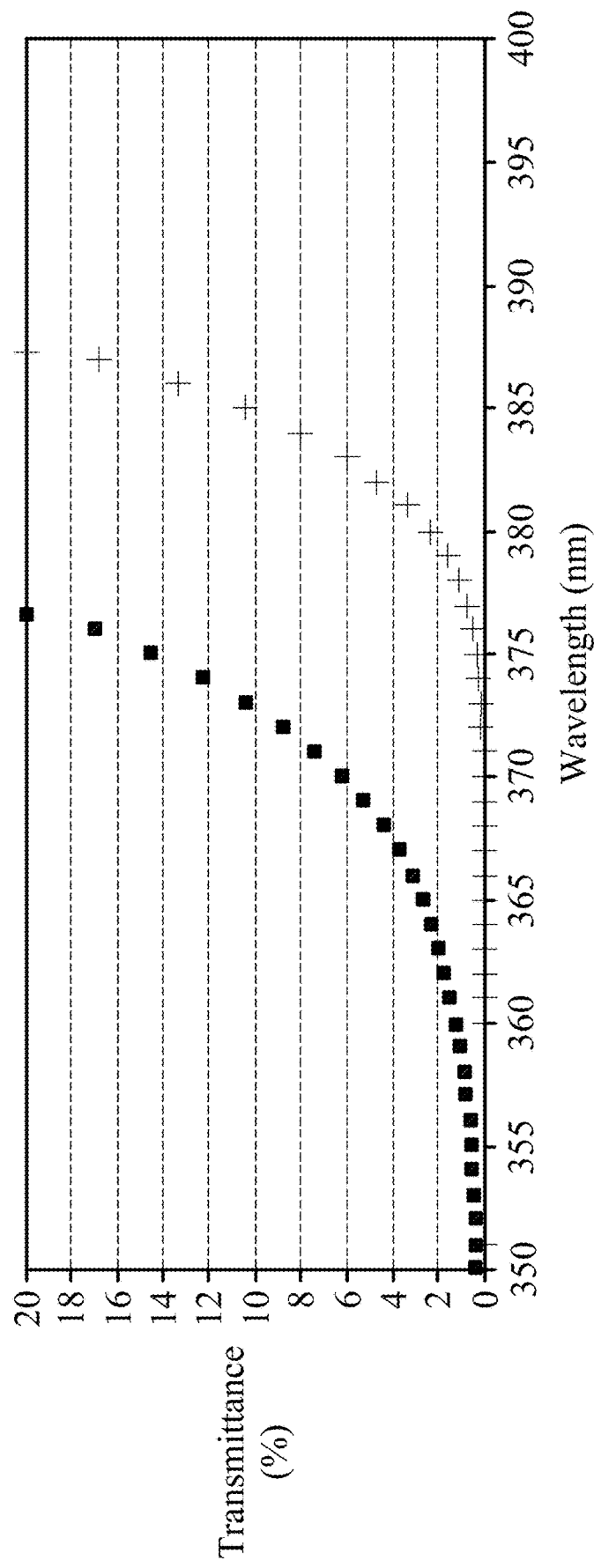
FIG. 8B shows a local amplification diagram of FIG. 8A.

The alterations in transmittance with respect to a light with different wavelengths of the present attachment member capable of reducing short-wavelength light In this example, the tests for the transmittance with respect to a light with different wavelengths of the present attachment member capable of reducing short-wavelength light (e.g., samples 1 and 2) were performed. The results are shown in FIGS. 8A and 8B. FIG. 8B shows a local amplification diagram of FIG. 8A.

It can be seen from the results in FIGS. 8A and 8B that the transmittance of sample 1 is less than or equal to 20% with respect to a light at least with the wavelength in a range from 300 nm to 370 nm (300 nm≤wavelength≤370 nm). Similarly, the transmittance of sample 2 is less than or equal to 20% with respect to a light at least with in the wavelength range from 300 nm to 385 nm (300 nm≤wavelength<385 nm). It can be verified from the above results that, in the present disclosure, the attachment member capable of reducing short-wavelength light (such as UV light) used on the panel can reduce the light transmittance of the short-wavelength light. For example, reducing the transmittance of at least part of the ultraviolet-wavelength light to reduce the risk of deterioration of the liquid crystal of the panel due to ultraviolet light exposure.

Figure 9:
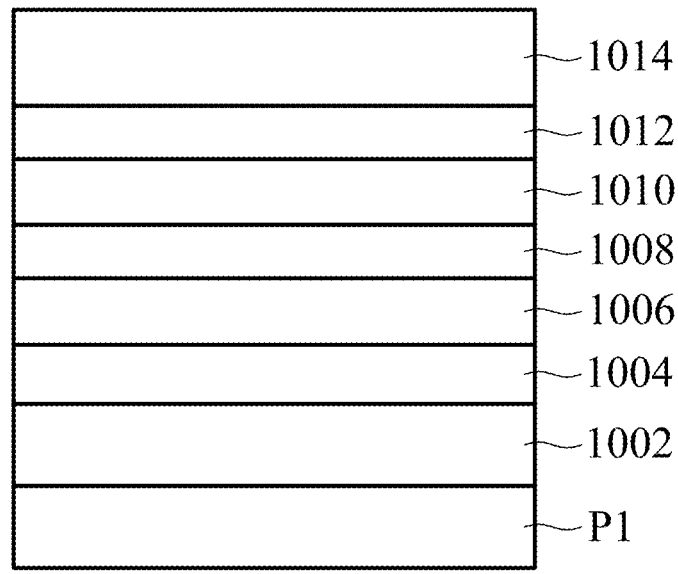
FIG. 9 shows a schematic cross-sectional view of an electronic device in accordance with one embodiment of the present disclosure.

Referring to FIG. 9, in accordance with one embodiment of the present disclosure, an electronic device 1000 is provided. FIG. 9 is a schematic cross-sectional view of the electronic device 1000. Materials, characteristics, dimensions, etc. of similar components (such as the panel, the protective substrate, and the attachment member) in FIG. 9 can be referred to the description in FIG. 1, for example.

As shown in FIG. 9, the electronic device 1000 is provided with a writing board P1, a panel 1002, an attachment member 1004, a touch layer 1006 (e.g., an ITO film), an attachment member 1008, a touch layer 1010 (e.g., an ITO film), an attachment member 1012 and a protective substrate 1014 from bottom to top. For descriptions of the touch layer 1006 (e.g., an ITO film) and the touch layer 1010 (e.g., an ITO film), please refer to the above description of the touch layer 62 and the touch layer 66. In FIG. 9, the electronic device 1000 is not provided with a light-guide plate and a light source. In addition, the panel 1002 and the writing board P1 may be bonded through other attachment members (not shown).

In accordance with some embodiments, the panel 1002 may include a reflective display or a semi-transflective display.

In accordance with some embodiments, the materials of the attachment members 1004, 1008 and 1012 may include acrylic-based polymers or other suitable materials.

In accordance with some embodiments, the transmittance of the attachment member 1004, the attachment member 1008, and/or the attachment member 1012 may be selectively less than or equal to 20% (or 15%) with respect to a light with a wavelength in a range from 380 nm to 430 nm (380 nm≤wavelength≤430 nm), but the present disclosure is not limited thereto.

In accordance with some embodiments, other optical layers (not shown, such as anti-glare layers, anti-reflective layers, and anti-fouling layers) may further be provided on the protective substrate 1014, but the present disclosure is not limited thereto.

In accordance with some embodiments, an electronic device (not shown) is provided, and its structure is similar to the electronic device 1000 shown in FIG. 9. The main difference between the two is that the electronic device does not have a touch component. For example, the attachment member 1004, the touch layer 1006 (such as an ITO film), the attachment member 1008, and the touch layer 1010 (such as an ITO film) in FIG. 9 are omitted. The rest are similar to those disclosed in FIG. 9 and will not be described again here.

In accordance with some embodiments, an electronic device (not shown) is provided, and its structure is similar to the electronic device 1000 shown in FIG. 9. The main difference between the two is that the electronic device is provided with a single-layer touch layer (such as an ITO film). For example, the attachment member 1008 and the touch layer 1010 (such as an ITO film) in FIG. 9 are omitted. The rest are similar to those disclosed in FIG. 9 and will not be described again here.

Figure 10:
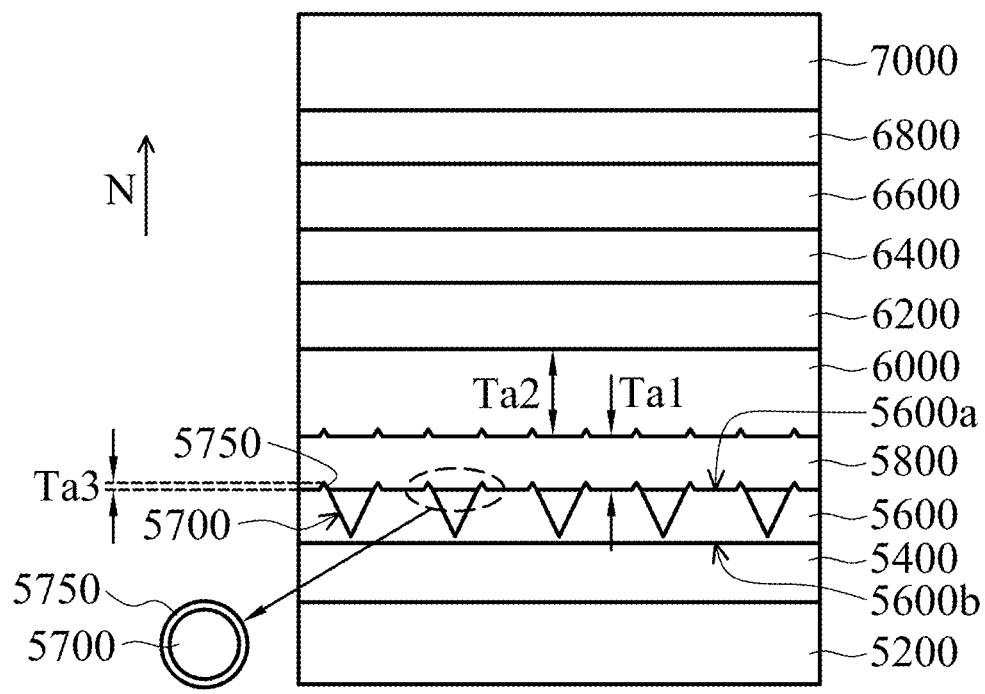
FIG. 10 shows a schematic cross-sectional view of an electronic device in accordance with one embodiment of the present disclosure.

Referring to FIG. 10, in accordance with one embodiment of the present disclosure, an electronic device 5000 is provided. FIG. 10 is a schematic cross-sectional view of the electronic device 5000. Materials, characteristics, dimensions, etc. of similar components (such as the light-guide plate, the panel, the protective substrate, and the attachment member) in FIG. 10 can be referred to the description in FIG. 1, for example.

As shown in FIG. 10, the electronic device 5000 is provided with a panel 5200, an attachment member 5400, a light-guide plate 5600, an attachment member 5800, an attachment member 6000, a touch layer 6200 (such as an ITO film, but not limited thereto), an attachment member 6400, a touch layer 6600 (such as an ITO film, but not limited thereto), an attachment member 6800, and a protective substrate 7000 from bottom to top, but the present disclosure is not limited thereto.

As shown in FIG. 10, the light-guide plate 5600 is disposed on the panel 5200 and has a first surface 5600a and a second surface 5600b opposite to each other. The first surface 5600a is away from the panel 5200. The first surface 5600a has a plurality of optical units 5700 (recessed structures) and a plurality of protruding structures 5750. The plurality of protruding structures 5750 are respectively adjacent to the plurality of optical units 5700 (recessed structures). For example, the protruding structure 5750 surrounds the optical unit 5700 (referring to the enlarged top view of the optical unit 5700 and the protruding structure 5750 indicated by the arrow in FIG. 10). The protective substrate 7000 is disposed on the light-guide plate 5600. The attachment member 5800 is disposed between the light-guide plate 5600 and the protective substrate 7000 and in contact with the first surface 5600a of the light-guide plate 5600. The attachment member 6000 is disposed between the attachment member 5800 and the protective substrate 7000. In accordance with some embodiments, the thickness Ta3 of the protruding structure 5750 is greater than 0 and less than or equal to 8 μm, or greater than 0 and less than or equal to 7 μm, or greater than 0 and less than or equal to 6 μm, or greater than 0 and less than or equal to 5 μm, but the present disclosure is not limited thereto.

As shown in FIG. 10, a capacitive touch component may be formed between the touch layer 6200 and the touch layer 6600. In accordance with some embodiments, one of the touch layer 6200 and the touch layer 6600 may, for example, transmit a sensing signal, and the other may, for example, receive a sensing signal, but the present disclosure is not limited thereto. In accordance with some embodiments, the touch layer 6200 and the touch layer 6600 may optionally include a full-surface conductive layer (not shown) or a patterned touch conductive layer (not shown). In accordance with some embodiment (not shown), a transparent substrate (glass or other transparent substrate) may be provided between the touch layer 6200 (such as an ITO film, but not limited thereto) and the touch layer 6600 (such as an ITO film, but not limited thereto), but the present disclosure is not limited thereto.

In accordance with some embodiments, any of the above components can be selectively removed, or other components can be inserted between these components.

In accordance with some embodiments, the panel 5200 may include a reflective display or a transflective display.

In accordance with some embodiments, along the normal direction N of the panel 5200, the thickness Ta2 of the attachment member 6000 is greater than the thickness Ta3 of one of the plurality of protruding structures 5750. In accordance with some embodiments, along the normal direction N of the panel 5200, the thickness Ta2 of the attachment member 6000 is greater than the thickness Ta1 of the attachment member 5800. In accordance with some embodiments, the ratio of the thickness Ta2 of the attachment member 6000 to the thickness Ta1 of the attachment member 5800 is greater than or equal to 2 and less than or equal to 20, but the present disclosure is not limited thereto. In accordance with some embodiments, the ratio of the thickness Ta2 of the attachment member 6000 to the thickness Ta1 of the attachment member 5800 is greater than or equal to 4 and less than or equal to 16. In accordance with some embodiments, the ratio of the thickness Ta2 of the attachment member 6000 to the thickness Ta1 of the attachment member 5800 is greater than or equal to 6 and less than or equal to 14. In accordance with some embodiments, the ratio of the thickness Ta2 of the attachment member 6000 to the thickness Ta1 of the attachment member 5800 is greater than or equal to 8 and less than or equal to 12. If the attachment member 6000 is too thin, the filling effect will be poor. If the attachment member 6000 is too thick, the cost and stacking thickness will be increased. In accordance with some embodiments, the thickness Ta2 of the attachment member 6000 is greater than the thickness Ta1 of the attachment member 5800, and the thickness Ta1 of the attachment member 5800 is greater than the thickness Ta3 of one of the plurality of protruding structures 5750. When the thickness Ta2 of the attachment member 6000 is greater than the thickness Ta1 of the attachment member 5800 and the thickness Ta3 of one of the plurality of protruding structures 5750, the filling effect is improved. The thickness Ta1 is measured, for example, by measuring the thickness of the attachment member 5800 in the area that does not overlap the protruding structure 5750 from a cross-sectional view, and averaging the thicknesses of any three areas to obtain the thickness Ta1. The thickness Ta2 is measured, for example, by measuring the thickness of the attachment member 6000 in the area that does not overlap the protruding structure 5750 from a cross-sectional view, and averaging the thicknesses of any three areas to obtain the thickness Ta2.

In accordance with some embodiments, the loss tangent (tan δ) at 30° C. of the attachment member 5800 is greater than 0 and less than or equal to 0.4, or greater than 0 and less than or equal to 0.35, or greater than 0 and less than or equal to 0.3, but the present disclosure is not limited thereto. When the attachment member 5800 is made of hard glue (that is, glue without fluidity), the attachment member 5800 does not need to be cured. Therefore, the loss tangent (tan δ) of the attachment member 5800 is measured, for example, using an uncured attachment member.

In accordance with some embodiments, the loss tangent (tan δ) at 30° C. of the attachment member 6000 is greater than or equal to 0.4 and less than 1, or greater than or equal to 0.5 and less than 0.9, or greater than or equal to 0.6 and less than 0.8, but the present disclosure is not limited thereto. When the attachment member 6000 is made of soft glue (that is, glue with fluidity), the attachment member 6000 may need to be cured, for example. Therefore, the loss tangent of the attachment member 6000 is measured, for example, using a cured attachment member.

In accordance with some embodiments, the loss tangent at 30° C. of the attachment member 5800 is less than the loss tangent at 30° C. of the attachment member 6000. In accordance with some embodiments, the ratio of the loss tangent at 30° C. of the attachment member 5800 to the loss tangent at 30° C. of the attachment member 6000 is greater than or equal to 0.01 and less than 1, or greater than or equal to 0.05 and less than 0.8, or greater than or equal to 0.05 and less than 0.6, but the present disclosure is not limited thereto.

In accordance with some embodiments, the loss modulus of the attachment member 5800 is greater than or equal to 10 Kpa and less than or equal to 70 Kpa, or greater than or equal to 20 Kpa and less than or equal to 60 Kpa, or greater than or equal to 30 Kpa and less than or equal to 50 Kpa, but the present disclosure is not limited thereto. In accordance with some embodiments, the loss modulus of the attachment member 6000 is greater than or equal to 10 Kpa and less than or equal to 70 Kpa, or greater than or equal to 20 Kpa and less than or equal to 60 Kpa, or greater than or equal to 30 Kpa and less than or equal to 50 Kpa, but the present disclosure is not limited thereto. In accordance with some embodiments, the storage modulus of the attachment member 5800 is greater than or equal to 200 Kpa and less than or equal to 400 Kpa, or greater than or equal to 220 Kpa and less than or equal to 380 Kpa, or greater than or equal to 250 Kpa and less than or equal to 350 Kpa, or greater than or equal to 280 Kpa and less than or equal to 320 Kpa, but the present disclosure is not limited thereto. In accordance with some embodiments, the storage modulus of the attachment member 6000 is greater than or equal to 20 Kpa and less than or equal to 100 Kpa, or greater than or equal to 25 Kpa and less than or equal to 95 Kpa, or greater than or equal to 30 Kpa and less than or equal to 90 Kpa, or greater than or equal to 35 Kpa and less than or equal to 85 Kpa, but the present disclosure is not limited thereto. It should be noted that when the attachment member 5800 is made of hard glue (that is, glue without fluidity), the attachment member 5800 does not need to be cured. Therefore, the loss modulus or the storage modulus of the attachment member 5800 is measured, for example, using an uncured attachment member. When the attachment member 6000 is made of soft glue (that is, glue with fluidity), the attachment member 6000 may need to be cured, for example. Therefore, the loss modulus or the storage modulus of the attachment member 6000 is measured, for example, using a cured attachment member.

In accordance with some embodiments, the transmittance of at least one of the attachment member 5800 and the attachment member 6000 is less than or equal to 20% with respect to a light with a wavelength in a range from 380 nm to 430 nm (380 nm≤wavelength ≤430 nm), but the present disclosure is not limited thereto. In accordance with some embodiments, the transmittance of at least one of the attachment member 5800 and the attachment member 6000 is less than or equal to 20% (or 15%) with respect to a light with a wavelength in a range of ultraviolet light (for example, 20 nm≤wavelength<380 nm), but the present disclosure is not limited thereto. In accordance with some embodiments, the transmittance of at least one of the attachment member 5800 and the attachment member 6000 is less than or equal to 20% (or 15%) with respect to a light with a wavelength less than or equal to 430 nm (wavelength≤430 nm), but the present disclosure is not limited thereto. For example, the transmittance of at least one of the attachment member 5800 and the attachment member 6000 is less than or equal to 20% (or 15%) with respect to a light with a wavelength less than or equal to 420 nm (wavelength≤420 nm), but the present disclosure is not limited thereto. For example, the transmittance of at least one of the attachment member 5800 and the attachment member 6000 is less than or equal to 20% (or 15%) with respect to a light with a wavelength less than or equal to 400 nm (wavelength≤400 nm). For example, the transmittance of at least one of the attachment member 5800 and the attachment member 6000 is less than or equal to 20% (or 15%) with respect to a light with a wavelength less than or equal to 380 nm (wavelength≤380 nm). Through the design of the transmittance of the above-mentioned attachment member with respect to a light with in different wavelength ranges, the possibility of the panel being affected by short-wavelength light (such as ultraviolet light or other light) and thus degrading the materials in the panel can be reduced.

Figure 11:
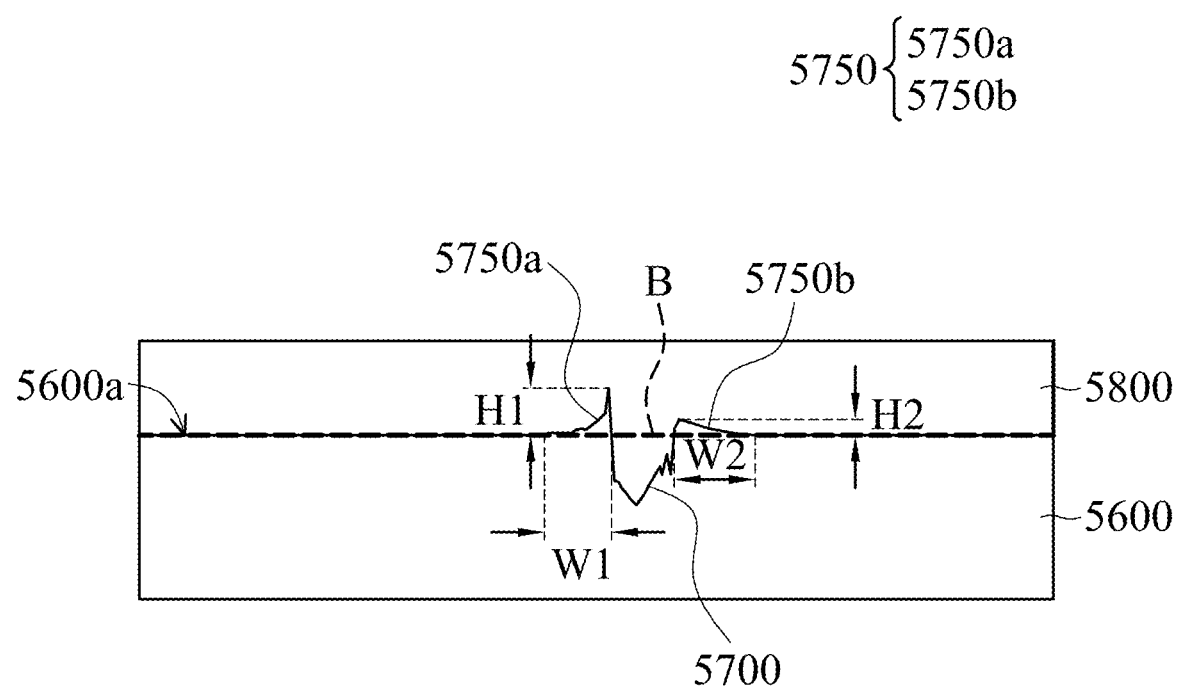
FIG. 11 shows a schematic cross-sectional view of a protruding structure in an electronic device in accordance with one embodiment of the present disclosure.

Referring to FIG. 11, in accordance with one embodiment of the present disclosure, the appearance of the protruding structure 5750 in the electronic device 5000 is described. FIG. 11 is a schematic cross-sectional view of the protruding structure 5750 in the electronic device 5000.

As shown in FIG. 11, the relatively flat parts of the first surface 5600a of the light-guide plate 5600 are connected to form a baseline B. The part protruding above the baseline B is called a protruding structure. The thickness Ta3 of the protruding structure 5750 can be calculated, for example, from the baseline B to the highest point of the protruding structure 5750. In FIG. 11, in a cross-sectional view, the protruding structure 5750 includes a first protruding structure 5750a and a second protruding structure 5750b respectively located on both sides of the optical unit 5700. In accordance with some embodiments, the thickness H1 of the first protruding structure 5750a may be different or the same as the thickness H2 of the second protruding structure 5750b. The thickness H1 may be calculated, for example, from the baseline B to the highest point of the first protruding structure 5750a. The thickness H2 can be calculated, for example, from the baseline B to the highest point of the second protruding structure 5750b. In accordance with some embodiments, the width W1 of the first protruding structure 5750a may be different from the width W2 of the second protruding structure 5750b. In accordance with some embodiments, the first protruding structure 5750a and the second protruding structure 5750b are asymmetric protruding structures. In accordance with some embodiments (not shown), the first protruding structure 5750a and the second protruding structure 5750b are symmetrical protruding structures.

In accordance with some embodiments, other optical layers (not shown, such as anti-glare layers, anti-reflective layers, and anti-fouling layers) may further be optionally provided on the protective substrate 7000, but the present disclosure is not limited thereto.

In accordance with some embodiments, an electronic device (not shown) is provided, and its structure is similar to the electronic device 5000 shown in FIG. 10. The main difference between the two is that the electronic device is not provided with a touch component. For example, the touch layer 6200 (such as an ITO film), the attachment member 6400, the touch layer 6600 (such as an ITO film), and the attachment member 6800 in FIG. 10 are omitted. Other features are similar to those disclosed in FIG. 10 and will not be described again here.

Figure 12:
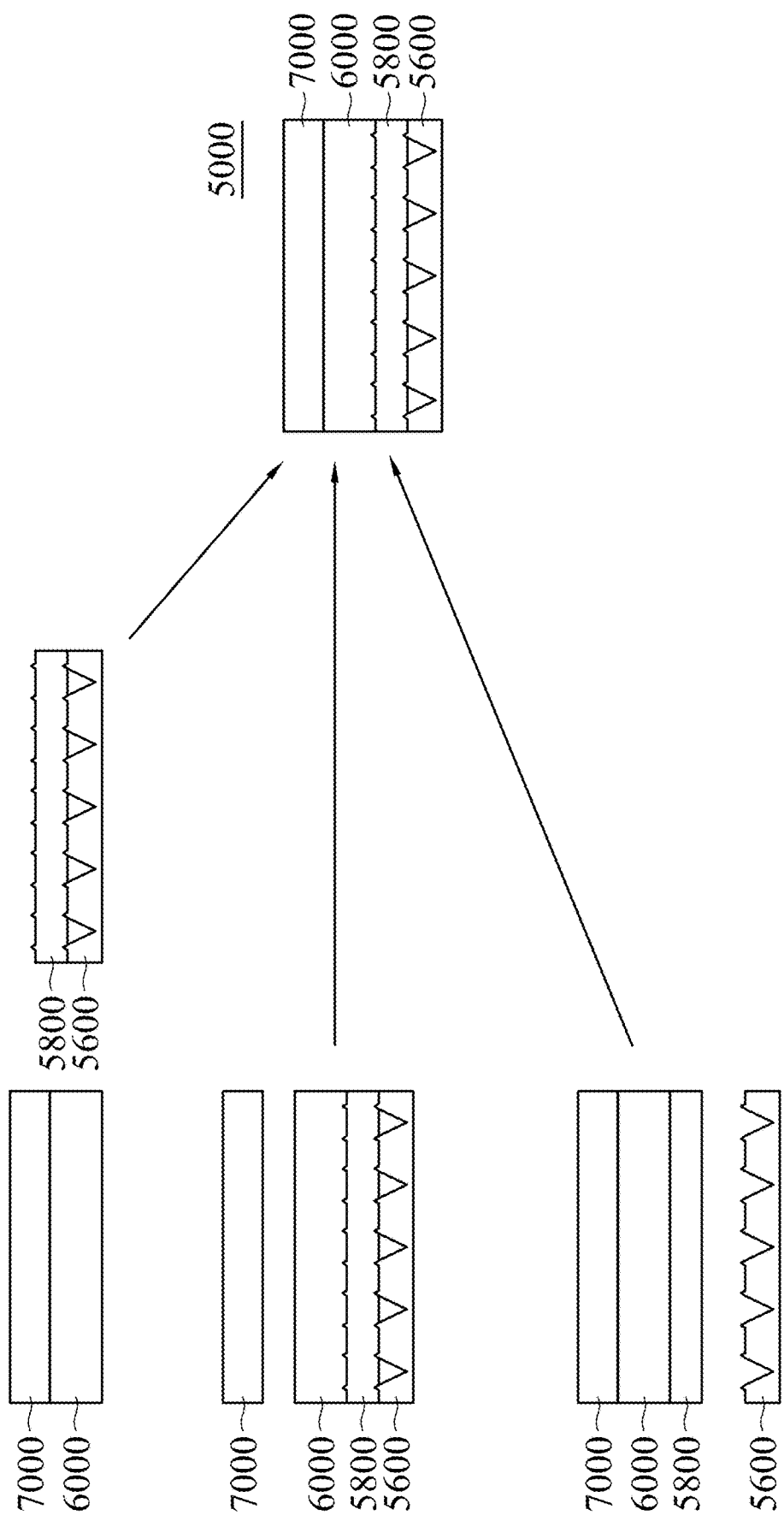
FIG. 12 shows a schematic cross-sectional view of a method for fabricating an electronic device in accordance with one embodiment of the present disclosure.

Referring to FIG. 12, in accordance with one embodiment of the present disclosure, a method for manufacturing the electronic device 5000 is provided. FIG. 12 is a schematic cross-sectional view of the method for manufacturing the electronic device 5000.

For convenience of illustration, the manufacturing method of the electronic device 5000 is described here using components such as the light-guide plate 5600, the attachment member 5800, the attachment member 6000, and the protective substrate 7000. Here, the manufacturing method of the electronic device 5000 includes at least three methods, as shown in FIG. 12. For example, in the first method, first, the attachment member 6000 is attached to the protective substrate 7000, and the attachment member 5800 is attached to the light-guide plate 5600. After that, the protective substrate 7000 including the attachment member 6000 and the light-guide plate 5600 including the attachment member 5800 are attached to each other to produce the electronic device 5000.

For example, in the second method, first, the attachment member 5800 and the attachment member 6000 are attached to the light-guide plate 5600, and then the light-guide plate 5600 including the attachment member 5800 and the attachment member 6000 is attached to the protective substrate 7000 to produce the electronic device 5000.

For example, in the third method, first, the attachment member 6000 and the attachment member 5800 are attached to the protective substrate 7000, and then the protective substrate 7000 including the attachment member 6000 and the attachment member 5800 is attached to the light-guide plate 5600 to produce the electronic device 5000.

Figure 13:
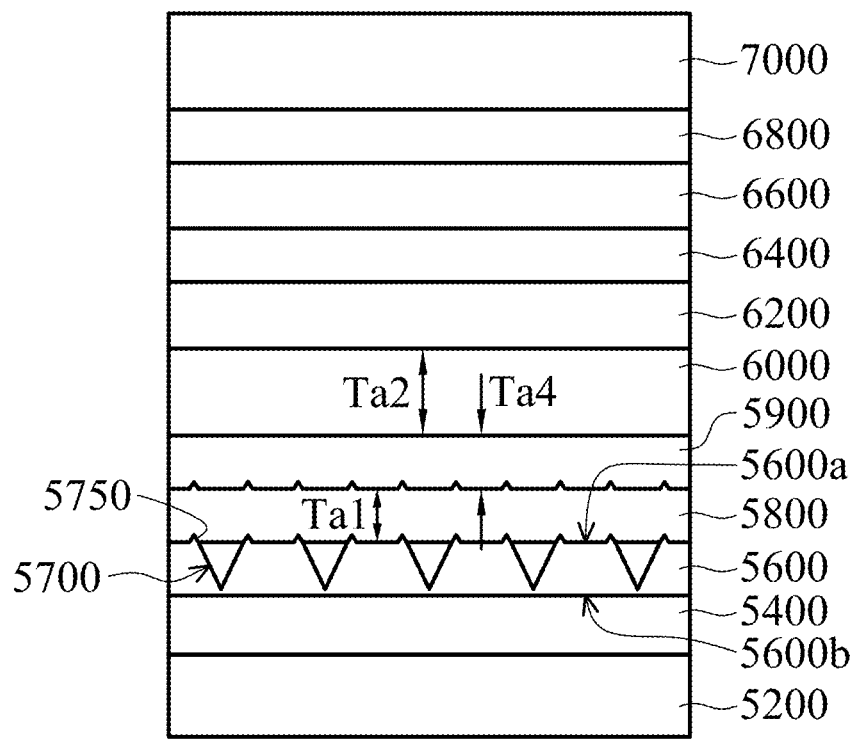
FIG. 13 shows a schematic cross-sectional view of an electronic device in accordance with one embodiment of the present disclosure.

Referring to FIG. 13, in accordance with one embodiment of the present disclosure, an electronic device 5000' is provided. FIG. 13 is a schematic cross-sectional view of the electronic device 5000'.

As shown in FIG. 13, the structure of the electronic device 5000' is similar to the electronic device 5000 shown in FIG. 10. The main difference between the two is that the electronic device may have an additional substrate 5900 between the attachment member 5800 and the attachment member 6000. In accordance with some embodiments, the substrate 5900 may be a thin transparent substrate. In accordance with some embodiments, the thickness Ta4 of the substrate 5900 is less than the thickness of the upper and lower substrates (not shown) of the panel 5200. In accordance with some embodiments, the thickness Ta4 of the substrate 5900 is less than the thickness Ta2 of the attachment member 6000. In accordance with some embodiments (not shown), the thickness Ta4 of the substrate 5900 is greater than the thickness Ta2 of the attachment member 6000 and the thickness Ta1 of the attachment member 5800. Other features are similar to those disclosed in FIG. 10 and will not be described again here. The thickness Ta4 is measured, for example, by measuring the thickness of the substrate 5900 in the area that does not overlap the protruding structure 5750 from a cross-sectional view, and averaging the thicknesses of any three areas to obtain the thickness Ta4.

It should be noted that, in other embodiments, a writing board may also be provided below the panel.

It should be noted that the touch layers in the different embodiments mentioned above may include touch glass, touch layers or other components with touch functions, but the present disclosure is not limited thereto. In accordance with some embodiments, the touch layer may include touch electrodes and wires electrically connected to them, etc. In accordance with some embodiments, the materials of the touch electrodes and wires may include metal materials or transparent conductive materials.

In the present disclosure, the loss tangent at 30° C. of the attachment member is designed to be less than or equal to 1, and the attachment member is attached to the side having multiple optical units of the light-guide plate. Due to the greater rigidity of such type of the attachment member, it is difficult for such type of the attachment member to fill in the dots of the light-guide plate after being attached to the light-guide plate, which can reduce glare effects and maintain light-guide efficiency. Furthermore, in the present disclosure, in addition to the attachment member (hard glue), the attachment member (soft glue) with high loss tangent (tan δ) is further added between the protective substrate and the light-guide plate. The attachment member (soft glue) can be used to fill in the concave-convex structures formed on the attachment member (hard glue). When the light-guide plate and the protective substrate are bonded through the above-mentioned composite glue, the mura phenomenon caused by bubbles at the protrusions can be reduced.

It should be noted that when the disclosed attachment member is made of hard glue (that is, glue without fluidity), the disclosed attachment member does not need to be cured. Therefore, the loss tangent (tan δ), loss modulus or the storage modulus of the disclosed attachment member is measured, for example, using an uncured attachment member. It should be noted that when the disclosed attachment member is made of soft glue (that is, glue with fluidity), the disclosed attachment member may need to be cured, for example. Therefore, the loss tangent, loss modulus or the storage modulus of the disclosed attachment member is measured, for example, using a cured attachment member.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
a panel;
a light-guide plate disposed on the panel, wherein the light-guide plate has a first surface with a plurality of optical units; and
an attachment member in contact with a part of the first surface of the light-guide plate, wherein the attachment member has a loss tangent (tan δ) at 30° C., and the loss tangent at 30° C. of the attachment member is greater than 0 and less than or equal to 1, and the attachment member has a transmittance less than or equal to 20% with respect to a light with a wavelength in a range from 380 nm to 430 nm.

2. The electronic device as claimed in claim 1, wherein the light-guide plate has a second surface opposite to the first surface, and the second surface is adjacent to the panel.

3. The electronic device as claimed in claim 1, wherein the loss tangent at 30° C. of the attachment member is greater than 0 and less than or equal to 0.3.

4. The electronic device as claimed in claim 1, wherein the attachment member has a storage modulus at 30° C., and the storage modulus at 30° C. of the attachment member is greater than or equal to 10 Kpa and less than or equal to 2,000 Kpa.

5. The electronic device as claimed in claim 1, wherein the attachment member has a loss modulus at 30° C., and the loss modulus at 30° C. of the attachment member is greater than or equal to 5 Kpa and less than or equal to 300 Kpa.

6. The electronic device as claimed in claim 1, wherein one of the optical units has a depth, the attachment member has a thickness, and a ratio of the depth to the thickness is greater than or equal to 0.01 and less than or equal to 0.33.

7. The electronic device as claimed in claim 1, wherein adjacent optical units are separated by a minimum gap, the attachment member has a thickness, and a ratio of the minimum gap to the thickness is greater than or equal to 1 and less than or equal to 3.

8. The electronic device as claimed in claim 1, wherein the attachment member has a loss tangent at 95° C., the loss tangent at 95° C. of the attachment member is greater than 0.1 and less than or equal to 1, and the loss tangent at 95° C. of the attachment member is greater than the loss tangent at 30° C. of the attachment member.

9. The electronic device as claimed in claim 1, further comprising another attachment member disposed on the attachment member, wherein the loss tangent at 30° C. of the attachment member is less than a loss tangent at 30° C. of the another attachment member.

10. An electronic device, comprising:
a panel;

a light-guide plate disposed on the panel, wherein the light-guide plate has a first surface with a plurality of optical units; and an attachment member in contact with a part of the first surface of the light-guide plate, wherein the attachment member is separated from the at least one of the plurality of optical units by a gap, and the attachment member has a transmittance less than or equal to 20% with respect to a light with a wavelength in a range from 380 nm to 430 nm.

11. The electronic device as claimed in claim 10, wherein one of the optical units has a depth, and a ratio of the gap to the depth is greater than or equal to 0.3 and less than or equal to 1.

12. The electronic device as claimed in claim 10, wherein the light-guide plate has a second surface opposite to the first surface, and the second surface is adjacent to the panel.

13. An electronic device, comprising:

a panel;

a light-guide plate disposed on the panel and having a first surface and a second surface opposite to each other, wherein the first surface is away from the panel, the first surface has a plurality of recessed structures and a plurality of protruding structures, and the plurality of protruding structures are respectively adjacent to the plurality of recessed structures;

a protective substrate disposed on the light-guide plate;

a first attachment member disposed between the light-guide plate and the protective substrate and in contact with the first surface; and a second attachment member disposed between the first attachment member and the protective substrate, wherein along a normal direction of the panel, the second attachment member has a thickness greater than a thickness of one of the plurality of protruding structures.

14. The electronic device as claimed in claim 13, wherein the first attachment member has a loss tangent (tan δ) at 30° C. less than that of the second attachment member.

15. The electronic device as claimed in claim 14, wherein the loss tangent at 30° C. of the first attachment member is greater than 0 and less than or equal to 0.4.

16. The electronic device as claimed in claim 14, wherein the loss tangent at 30° C. of the second attachment member is greater than or equal to 0.4 and less than 1.0.

17. The electronic device as claimed in claim 14, wherein a ratio of the loss tangent at 30° C. of the first attachment member to the loss tangent at 30° C. of the second attachment member is greater than or equal to 0.01 and less than 1.0.

18. The electronic device as claimed in claim 13, wherein along the normal direction of the panel, and the thickness of the second attachment member is greater than a thickness of the first attachment member.

19. The electronic device as claimed in claim 18, wherein a ratio of the thickness of the second attachment member to the thickness of the first attachment member is greater than or equal to 2 and less than or equal to 20.

* * * * *